United States Patent
Jha

(10) Patent No.: US 11,783,060 B2
(45) Date of Patent: Oct. 10, 2023

(54) SYSTEM AND METHOD FOR ENERGY EFFICIENT SENSORS WITH COMPRESSION, ARTIFICIAL INTELLIGENCE, AND SECURITY

(71) Applicant: The Trustees of Princeton University, Princeton, NJ (US)

(72) Inventor: Niraj K. Jha, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 1068 days.

(21) Appl. No.: 16/479,714

(22) PCT Filed: Jan. 24, 2018

(86) PCT No.: PCT/US2018/014995
§ 371 (c)(1),
(2) Date: Jul. 22, 2019

(87) PCT Pub. No.: WO2018/140460
PCT Pub. Date: Aug. 2, 2018

(65) Prior Publication Data
US 2021/0357741 A1    Nov. 18, 2021

Related U.S. Application Data

(60) Provisional application No. 62/450,014, filed on Jan. 24, 2017.

(51) Int. Cl.
*G06F 21/60* (2013.01)
*H04W 12/03* (2021.01)
(Continued)

(52) U.S. Cl.
CPC .......... *G06F 21/606* (2013.01); *G06F 12/14* (2013.01); *G06N 3/04* (2013.01); *G06N 3/08* (2013.01);
(Continued)

(58) Field of Classification Search
CPC ........ G06F 21/606; G06F 12/14; G06N 3/02; G06N 3/04; G06N 3/0472; G06N 3/0481;
(Continued)

(56) References Cited

U.S. PATENT DOCUMENTS 8,712,157 B2 * 4/2014 Marchesotti .......... G06N 20/00
382/190
2004/0218760 A1   11/2004 Chaudhuri
(Continued)

OTHER PUBLICATIONS

S. Dasgupta and A. Gupta, "An elementary proof of the Johnson-Lindenstrauss lemma," Random Structures and Algorithms, vol. 22, No. 1, pp. 60-65, 2002.
(Continued)

*Primary Examiner* — Shane D Woolwine
(74) *Attorney, Agent, or Firm* — MEAGHER EMANUEL LAKS GOLDBERG & LIAO, LLP

(57) ABSTRACT

Devices and methods for processing detected signals at a detector using a processor are provided. The system involves (i) a data compressor that implements an algorithm for converting a set of data into a compressed set of data, (ii) a machine learning (ML) module coupled to the data compressor, the ML module transforming the compressed set of data into a vector and filtering the vector, (iii) a data encryptor coupled to the ML module that encrypts the filtered vector, and (iv) an integrity protection module coupled to the ML module, wherein the integrity protection module protects the integrity of the filtered vector.

26 Claims, 23 Drawing Sheets

(51) Int. Cl.
| | |
|---|---|
| *H04W 12/42* | (2021.01) |
| *H04W 12/106* | (2021.01) |
| *G06N 20/10* | (2019.01) |
| *G06N 3/04* | (2023.01) |
| *G06N 3/08* | (2023.01) |
| *H04L 9/32* | (2006.01) |
| *H04L 69/04* | (2022.01) |
| *H04W 4/38* | (2018.01) |
| *G06F 12/14* | (2006.01) |
| *H04W 84/18* | (2009.01) |

(52) U.S. Cl.
CPC ............ *G06N 20/10* (2019.01); *H04L 9/3239* (2013.01); *H04L 69/04* (2013.01); *H04W 4/38* (2018.02); *H04W 12/03* (2021.01); *H04W 12/106* (2021.01); *H04W 12/42* (2021.01); *H04W 84/18* (2013.01); *H04L 2209/72* (2013.01); *Y02D 30/70* (2020.08)

(58) Field of Classification Search
CPC .......... G06N 3/08; G06N 20/00; G06N 20/10; G06N 20/20; G06N 3/047; G06N 3/048; H04L 9/3239; H04L 69/04; H04L 2209/72; H04W 4/38; H04W 12/03; H04W 12/106; H04W 12/42; H04W 84/18; Y02D 30/70
See application file for complete search history.

(56) References Cited

U.S. PATENT DOCUMENTS

| | | | |
|---|---|---|---|
| 2009/0141932 | A1 | 6/2009 | Jones et al. |
| 2013/0332743 | A1 | 12/2013 | Gueron et al. |
| 2016/0022141 | A1 | 1/2016 | Mittal et al. |
| 2016/0034809 | A1 | 2/2016 | Trenholm et al. |
| 2016/0366346 | A1* | 12/2016 | Shin ............... G06V 10/145 |
| 2017/0331837 | A1* | 11/2017 | Moon ............... H04L 9/3236 |

OTHER PUBLICATIONS

M. Rudelson and R. Vershynin, "Non-asymptotic theory of random matrices: Extreme singular values," arXiv preprint arXiv:J003.2990, Apr. 2010.

R Q. Quiroga, Z. Nadasdy, and Y. Ben-Shaul, "Unsupervised spike detection and sorting with wavelets and superparamagnetic clustering," Neural Comp., vol. 16, No. 8, pp. 1661-1687, 2004.

International Search Report for PCT Application No. PCT/US2018/014995, dated Apr. 17, 2018.

* cited by examiner

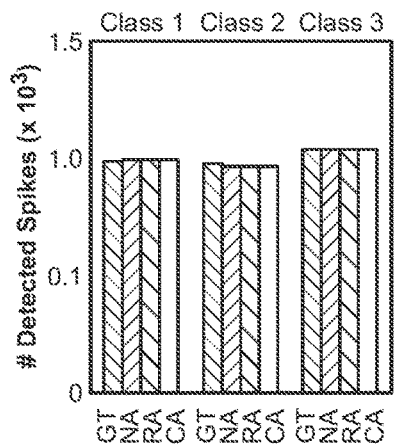
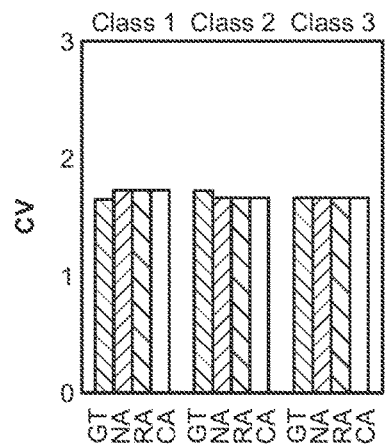
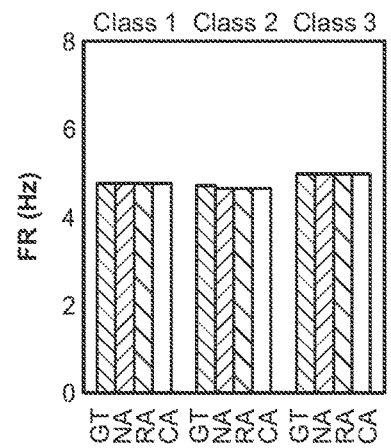
FIG. 8A  FIG. 8B  FIG. 8C
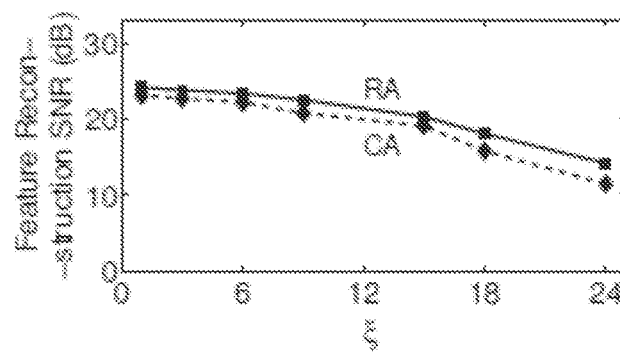
FIG. 9
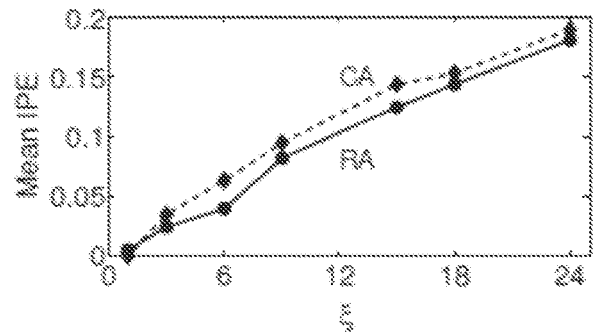
FIG. 10

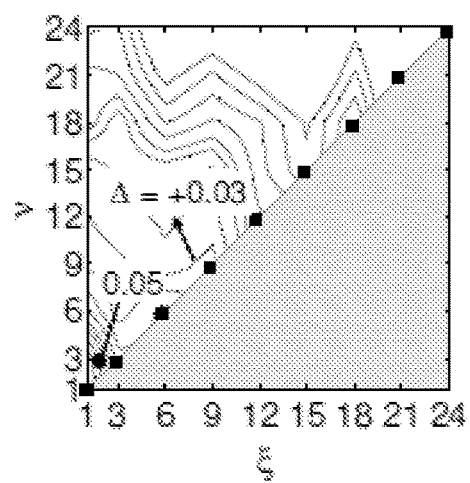
FIG. 11
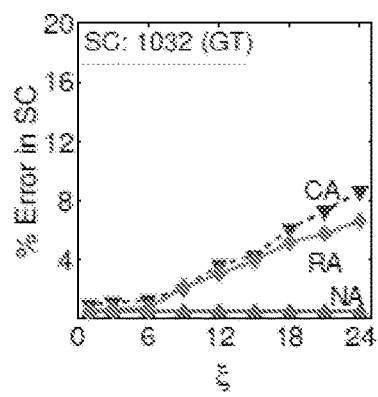 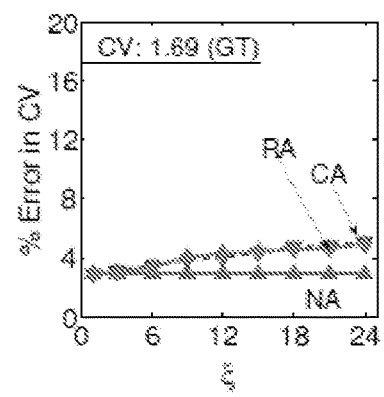 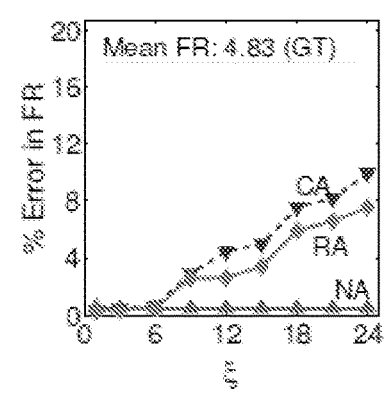
FIG. 12A　　　　　　　　FIG. 12B　　　　　　　　FIG. 12C (a) % Error in Mean SC (CA)

(b) % Error in Mean CV (CA)

(c) % Error in Mean FR (CA)

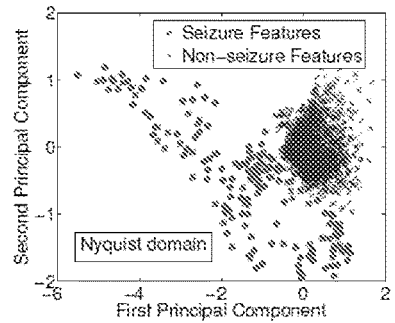 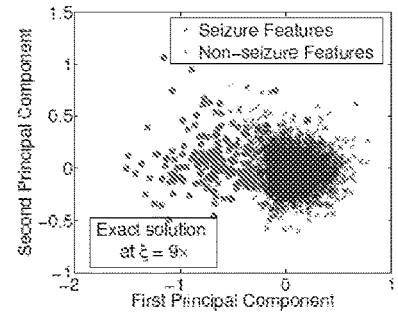 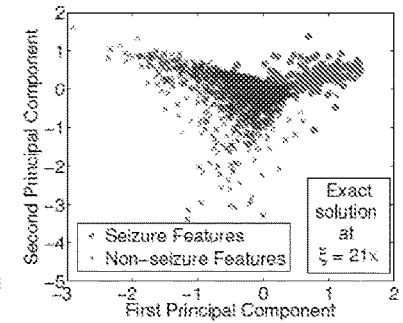
FIG. 29A　　　　　　FIG. 29B　　　　　　FIG. 29C
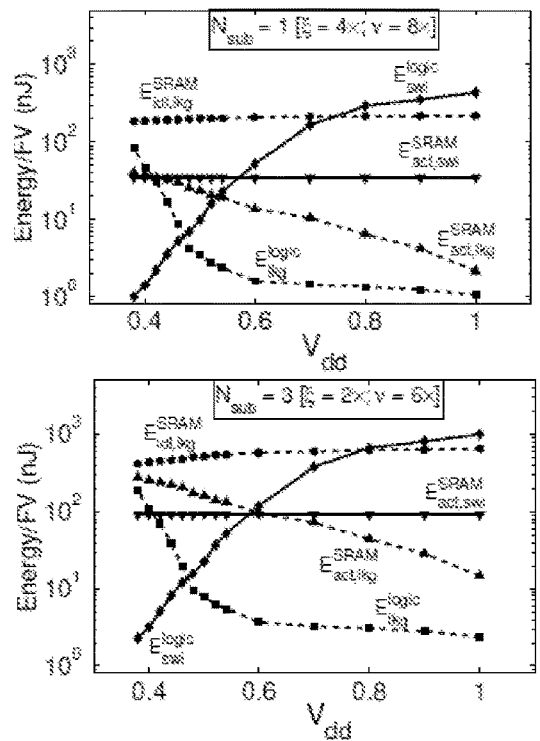 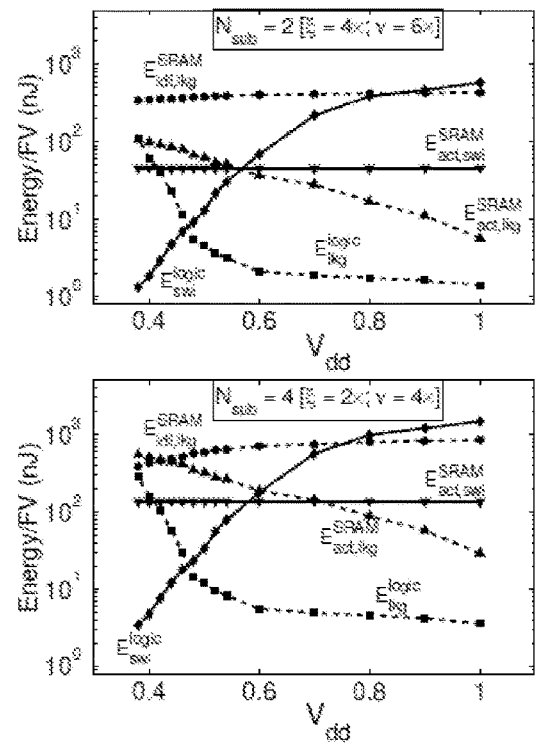
FIG. 30

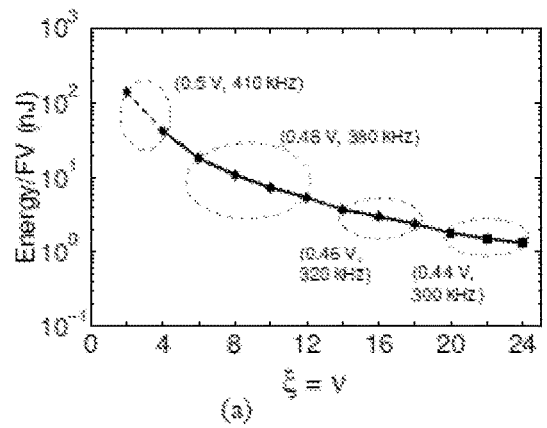
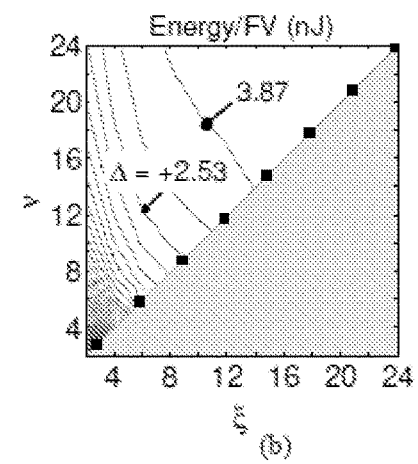
FIG. 34A FIG. 34B
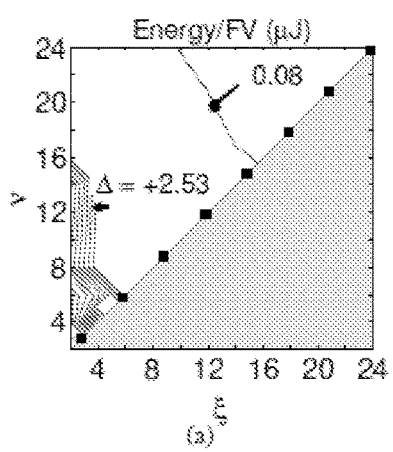
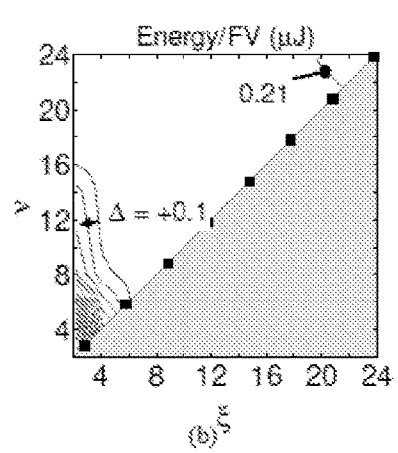
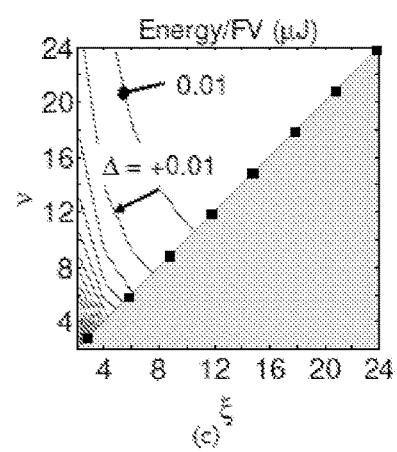
FIG. 35A FIG. 35B FIG. 35C

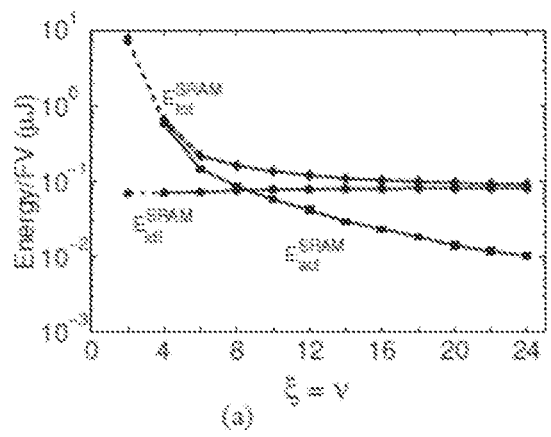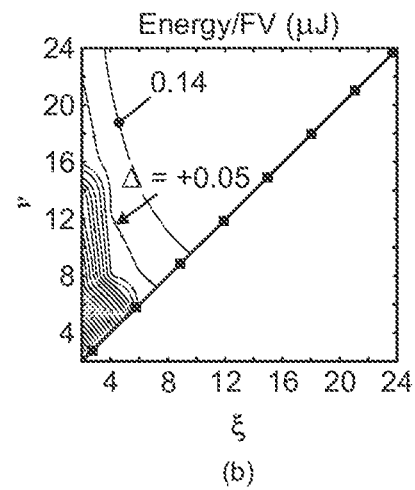
FIG. 36A    FIG. 36B
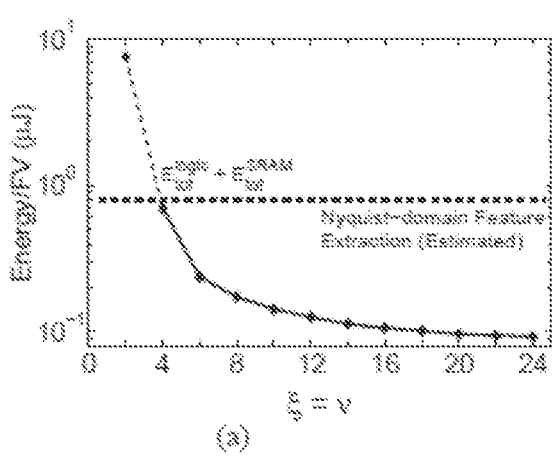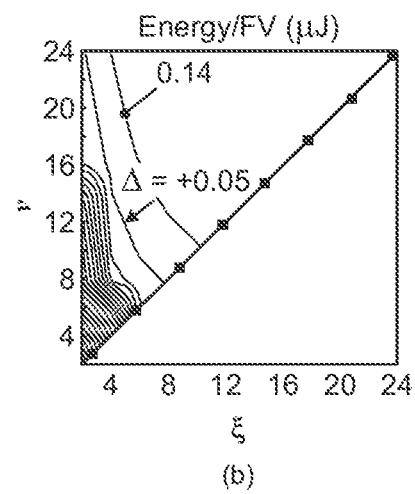
FIG. 37A    FIG. 37B

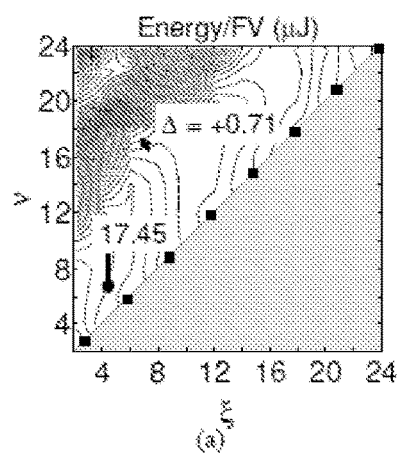
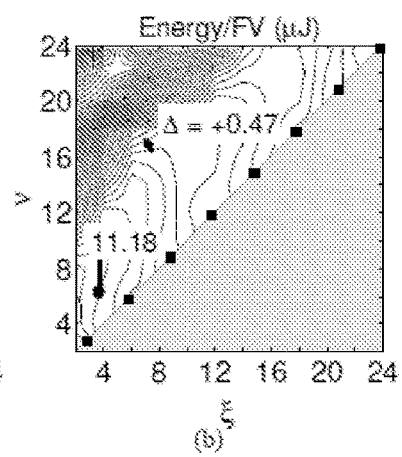
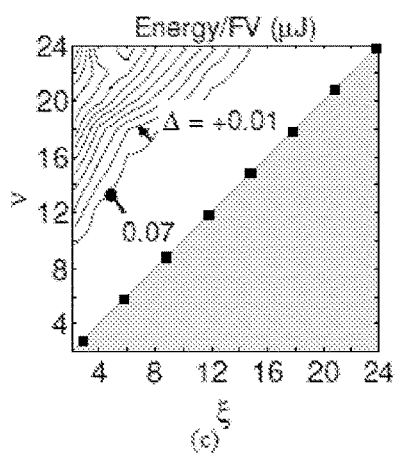
FIG. 38A      FIG. 38B      FIG. 38C
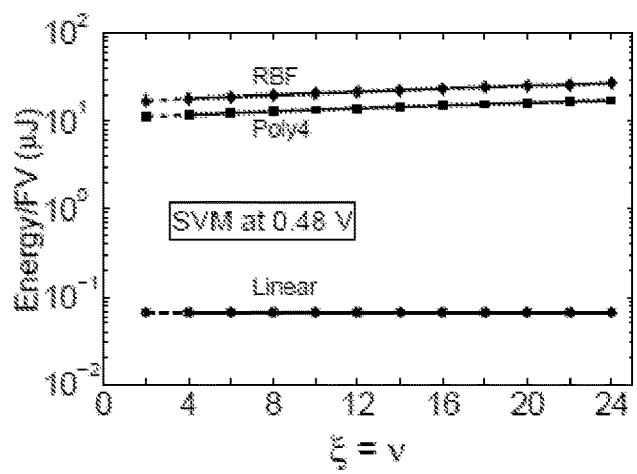
FIG. 39

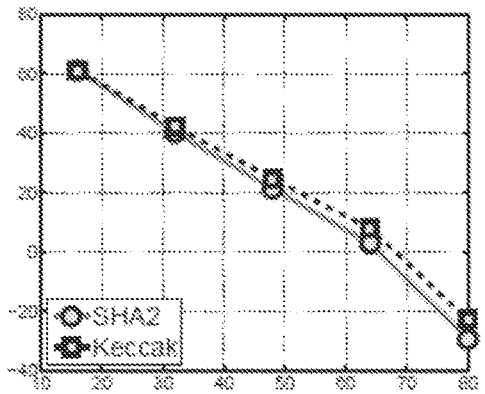
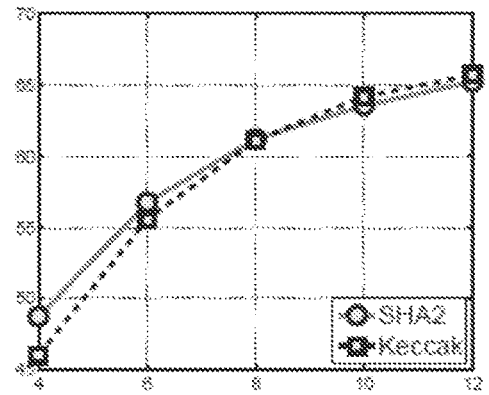
FIG. 42A   FIG. 42B
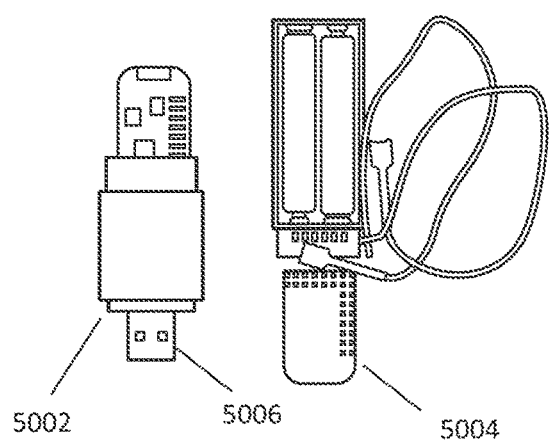
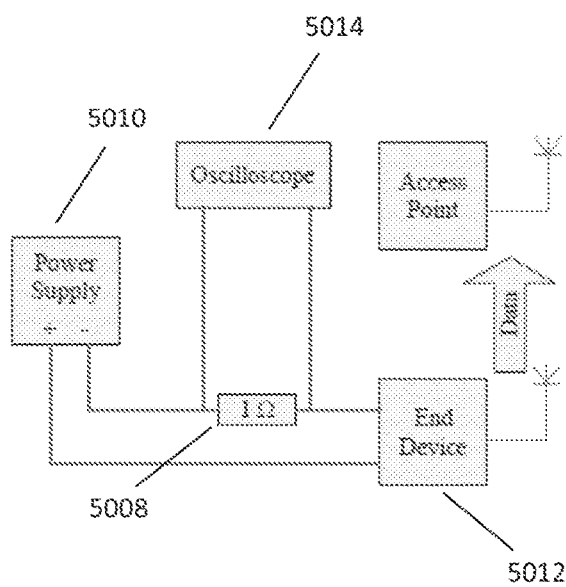
FIG. 43A   FIG. 43B

SYSTEM AND METHOD FOR ENERGY EFFICIENT SENSORS WITH COMPRESSION, ARTIFICIAL INTELLIGENCE, AND SECURITY

CROSS REFERENCE TO RELATED APPLICATIONS

The present application claims the benefit of U.S. Provisional Application Ser. No. 62/450,014 filed 24 Jan. 2017, which is incorporated herein by reference in its entirety.

GOVERNMENT SUPPORT CLAUSE

This invention was made with government support under Grants No. CNS-0914787 and No. CCF-1253670 awarded by the National Science Foundation. The government has certain rights in the invention.

TECHNICAL FIELD

Generally, this disclosure relates to sensors. More particularly, this disclosure relates to remote sensors.

BACKGROUND

Wireless sensor networks (WSNs) have been an active area of research for over a decade. These efforts have culminated in various application areas for sensor networks, including military and civilian surveillance, habitat observation, monitoring the health of physical structures, body area networks, and building energy efficiency, among others. Wireless sensor nodes almost always rely on a highly limited source of power—either a battery or environmental harvesting. In the case of battery-powered nodes, manual maintenance becomes necessary whenever the battery is depleted. In the case of energy harvesting, the energy source imposes a hard constraint on the amount of energy that may be used in a given period. Therefore, energy efficiency is a critical design concern in sensor networks.

Due to the sensitive nature of many WSN applications, secure communication mechanisms between the sensor nodes and base station are often required. The security objectives of a WSN include confidentiality, integrity, authentication, and availability. These objectives are often addressed using cryptographic primitives, such as encryption and hashing. However, state-of-the-art cryptographic algorithms are highly compute-intensive and impose a significant burden on the limited energy sources of sensor nodes (a reduction in lifetime by a factor of two or more is common when cryptography is used). Despite significant advances in lightweight implementations of cryptography for sensor networks, the stringent energy constraints inherent to wireless sensor nodes often imply that the use of state-of-the-art cryptographic algorithms is infeasible.

Current sensors do not use encryption/hashing to address the confidentiality/integrity requirements since doing so increases sensor energy by around 1.5×, i.e., this drains the battery 2.5× faster.

Current sensors do not perform on-chip inference. Again, this is due to the fact that on-chip inference can consume significant energy.

Currently, sensors just sense the targeted signal and transmit the data to the base station where inference may be performed from data collected from a large number of sensors.

At the base station, if the signals are raw, they can just be used for analysis. The limitation of an approach where signals are directly used or reconstructed for analysis at a base station is that it does not address the need to perform local signal analysis, because generally this is computationally intensive and thus impractical to perform on either the sensors or the gateway device. Further, the need for local analysis is gaining importance in advanced sensing systems, particularly for medical applications where local detection can enable closed-loop monitoring and therapeutic devices while also identifying the critical signal segments to enable transmission to centralized human experts for reconstruction and further analysis.

SUMMARY

The present disclosure combines secure/energy-efficient sensor design and smart/energy-efficient sensor design. It can be retrofitted to any existing sensor by feeding the output of the existing sensor to an ASIC or FPGA on which the system and technology is implemented. This provides a way to deal with legacy sensor hardware. In the future, however, it can also be implemented on the same IC as the sensor: this would lead to even greater energy efficiency. The signal can be compressively sensed by the sensor and transmitted to the base station. If the signal is compressively sensed, it can be reconstructed before analysis. The approach of performing analysis directly on compressed representations can have broad and valuable implications beyond systems where the aim is simply to move such functions from a base station to the local nodes.

The system and method according to the present disclosure can also be used to simply compressively sense the data, analyze the data, and then encrypt/hash it before sending it to a base station. This enables security and inference. In this case, inference can be performed at the sensor by analyzing the compressed data, and then encrypting the data and sending it to the base station for utilizing the intelligence provided from the sensors. If on-chip inference detects a rare event, the compressively-sensed signals around the rare event can also be transmitted to the base station for reconstruction and further analysis. Use of compression techniques, such as, for example, compressive sensing, before encryption/hashing eliminates the energy overhead. The present disclosure makes it possible to do inference on the sensor node at one to two orders of magnitude lower energy. The present disclosure makes the distilling of intelligence from the sensor data much more efficient by using a two-stage process where local intelligence is distilled from each sensor node and higher-level intelligence is distilled on the base station.

The system and method according to the present disclosure can be used to augment any Internet-of-Things (IoT) sensor so that its output can be sent to a base station in a secure fashion while the output of the local inference performed on the augmented sensor node can be fed to a second-stage inference system. This would also make the second-stage inference much more efficient and accurate. Analysis on compressed representations can enable a generalizable approach to substantially reduce computational energy for signal-processing operations.

A further use of the invention would be to significantly reduce the storage requirements at the sensor node and at higher levels of IoT.

A third use would be to plug the current security gap when sensors communicate data to the base station. Current systems do not use encryption, thus making the whole IoT system vulnerable to malicious attacks based on fake sensor data. This challenge is addressed by the invention.

It can be used to augment any IoT sensor to make it secure and smart, while maintaining its energy efficiency. The invention enables existing IoT sensors to be augmented for enabling security and inference. Sensors to base station communication is currently the weakest link in IoT security since a malicious attacker can easily send fake sensor data to the base station, causing it to make an incorrect inference, thus resulting in significant damage to the IoT system. The present disclosure prevents this by not only making energy-efficient security possible, but also by alleviating the inference burden on the base station by making energy-efficient on-sensor inference possible.

The following is a summary of measurement results from the IC.

The energy measurements from a compressed-domain feature extractor (CD-FE) block (logic and SRAM) were identified at different values of the logic supply voltage. Since the total CD-FE energy exhibits a non-linear relationship with respect to compression factor $\xi$ and a parameter called projection factor v, the optimal CD-FE logic voltage, $V_{dd,opt}$, was empirically determined such that it minimizes the total CD-FE energy at a given value of $\xi$ and v.

Energy measurements from the CD-FE block vs. $\xi$ and v were also identified. The CD-FE SRAM energy comprises the active- and idle-mode energies. At smaller values of $\xi$ and v, active-mode SRAM leakage energy, $E_{act,lkg}^{SRAM}$, tends to be the dominant component while at higher values of $\xi$ and v, the idle-mode SRAM leakage energy, $E_{idl,lkg}^{SRAM}$, is dominant. Further, the CD-FE logic and SRAM energy measurements showed that for values of $\xi > 4\times$, the total feature-extraction energy in the compressed domain is lower than that in the Nyquist domain.

The classification energy can dominate the feature-extraction energy when compressed-domain processing is used with non-linear SVM kernels. However, for linear kernels, feature-extraction energy dominates and compressed-domain processing can provide substantial energy scalability with respect to $\xi$ and v. Further, energy measurements from the processor (feature extraction+classification), also show a similar trend as the classifier for the linear and non-linear SVM kernels.

Sparsity of signals provides an opportunity to efficiently represent sensor data. Compressive sensing is one technique that exploits signal sparsity in a secondary basis to achieve very low-energy compression on the sensing node. The random projections in compressive sensing, however, affect the sensed signals, preventing the use of Nyquist-domain algorithms for signal analysis. Moreover, signal reconstruction is energy-intensive and is not desirable on low-power sensor nodes. An approach to overcome these limitations in systems is to use compressive sensing. Computations from the Nyquist domain are transformed to the compressed domain, enabling computations to be performed directly on compressively-sensed data. In particular, the design of a processor that enables on-node signal analysis to detect epileptic seizures directly using compressively-sensed electroencephalogram (EEG) is presented. By using an exact solution for the compressed-domain filtering matrices, the performance of the compressed-domain detector is retained up to high compression factors. Additionally, by using an approximate solution, smaller-sized compressed-domain filtering matrices were derived, saving more energy in the compressed domain. These methods provide two strong knobs to control the energy of the compressed-domain seizure-detection processor.

Thus, in addition to communication energy savings, through end-to-end data reduction in a system, the methodologies described herein enable a mode of power management where the computational energy scales due to both a reduction in the number of input samples that need to be processed and due to approximations introduced at the algorithmic level.

BRIEF DESCRIPTION OF THE DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

FIG. 8A shows accuracy of the spike sorting algorithm via the spike count (SC) performance value for NA, RA and CA, as compared to the ground truth (GT) in an exemplary embodiment.

FIG. 8B shows accuracy of the spike sorting algorithm via the coefficient of variation (CV) performance value for NA, RA and CA, as compared to the ground truth (GT) in an exemplary embodiment.

FIG. 8C shows accuracy of the spike sorting algorithm via the neuron firing rate (FR) performance value for NA, RA and CA, as compared to the ground truth (GT), according to an exemplary embodiment.

FIG. 9 shows the mean SNR computed over spikes in multiple records for RA and CA, according to an exemplary embodiment.

FIG. 10 shows the inner-product error (IPE) evaluated from the entire spike database for RA and CA, according to an exemplary embodiment.

FIG. 11 shows the IPE in CA, according to an exemplary embodiment.

FIG. 12A shows the mean and standard deviation of the estimation errors in SC for CA and RA, respectively, according to an exemplary embodiment.

FIG. 12B shows the mean and standard deviation of the estimation errors in CV for CA and RA, respectively, according to an exemplary embodiment.

FIG. 12C shows the mean and standard deviation of the estimation errors in FR for CA and RA, respectively, according to an exemplary embodiment.

FIGS. 29A-29C show a scatter plot of the first two principal components of the measured FVs from the IC, according to an exemplary embodiment. FIG. 29A shows results for Nyquist-domain processing. FIG. 29B shows results for exact solution at ξ=9×. FIG. 29C shows results for exact solution at ξ=21×.

FIG. 30 shows the measured subcomponents of the CDFE energy with respect to $V_{dd}$ when $N_{sub}$ ranges from 1 to 4 (corresponding to four different values of ξ and v), according to an exemplary embodiment.

FIG. 34A shows the CD-FE logic energy for the exact solution measured at $V_{dd,opt}$, according to an exemplary embodiment.

FIG. 34B shows the CD-FE logic energy for the approximate solution measured at $V_{dd,opt}$, according to an exemplary embodiment.

FIG. 35A shows the SRAM leakage energies in the idle mode, versus ξ and v, according to an exemplary embodiment.

FIG. 35B shows the SRAM leakage energies in the active mode, versus ξ and v, according to an exemplary embodiment.

FIG. 35C shows the SRAM switching energy in the active mode, versus ξ and v, according to an exemplary embodiment.

FIG. 36A shows the total SRAM energy for the exact solution, according to an exemplary embodiment.

FIG. 36B shows the total SRAM energy for the approximate solution, according to an exemplary embodiment.

FIG. 37A shows the total CD-FE energy (logic+SRAM) for the exact solution, according to an exemplary embodiment.

FIG. 37B shows the total CD-FE energy (logic+SRAM) for the approximate solution, according to an exemplary embodiment.

FIG. 38A shows the support-vector machine (SVM) classifier energy measured at the minimum-energy point of 0.48 V for the approximate solution using radial-basis function (RBF), according to an exemplary embodiment.

FIG. 38B shows the SVM classifier energy measured at the minimum-energy point of 0.48 V for the approximate solution using poly4, according to an exemplary embodiment.

FIG. 38C shows the SVM classifier energy measured at the minimum-energy point of 0.48 V for the approximate solution using linear kernel, according to an exemplary embodiment.

FIG. 39 shows the SVM classifier energy for the exact solution energy using RBF, poly4 and the linear kernel, according to an exemplary embodiment.

FIG. 42A shows that energy reduction $\rho(m, r)$ decreases as m increases when r is kept constant, according to an exemplary embodiment.

FIG. 42B shows how $\rho(m, r)$ increases with r when m is kept constant, according to an exemplary embodiment.

FIG. 43A shows a photograph of an Access Point (AP) and End Device (ED), according to an exemplary embodiment.

FIG. 43B shows a schematic diagram that depicts how current was measured, according to an exemplary embodiment.

FIG. 45A shows energy reduction for different compression ratios, and FIG. 45B shows energy reduction for different input sizes.

FIG. 46A shows energy bonus for different compression ratios, and FIG. 46B shows energy bonus for different input sizes.

FIG. 47A shows energy overhead for different compression ratios, and FIG. 47B shows energy overhead for different input sizes.

DETAILED DESCRIPTION

Figure 1:
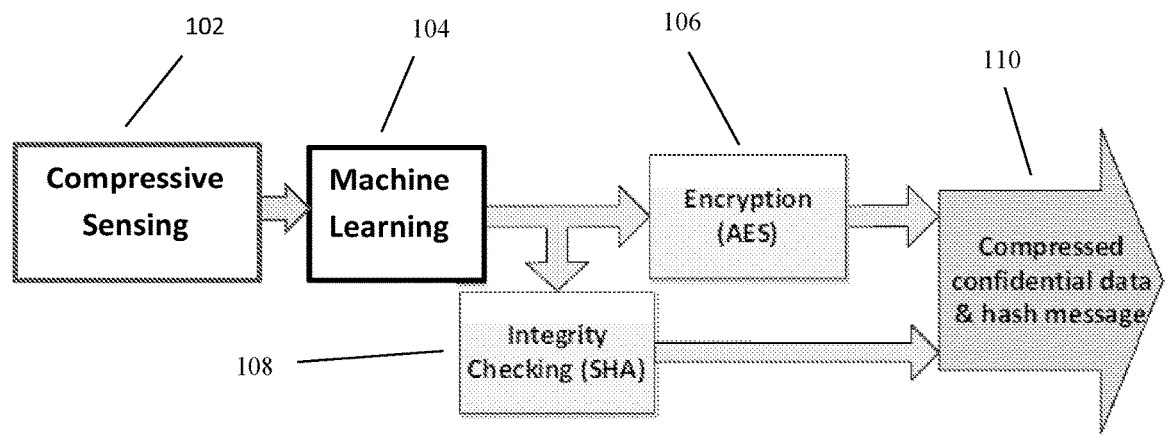
FIG. 1 shows a process according to an embodiment of the present disclosure.

This disclosure is now described more fully with reference to the set of accompanying illustrative drawings, in which example embodiments of this disclosure are shown. This disclosure may, however, be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of this disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

All references specifically cited herein are hereby incorporated herein by reference in their entireties for the purposes for which they are cited and for all other purposes. If any disclosures are incorporated herein by reference and such disclosures conflict in part and/or in whole with this disclosure, then to the extent of conflict, and/or broader disclosure, and/or broader definition of terms, this disclosure controls. If such disclosures conflict in part and/or in whole with one another, then to the extent of conflict, the later-dated disclosure controls.

The present disclosure describes certain embodiments relating to compressive sensing for simultaneously enabling energy-efficient encryption/hashing and inference on a sensor node. It can be used to augment any existing sensor, which typically just senses and transmits data to a base station, into a sensor that performs inference in a secure way, while maintaining energy efficiency. It can also be used to implement a secure, smart, and energy-efficient sensor in a single integrated circuit (IC).

Widely used network security protocols, such as SSL, have a provision for compressing packets using conventional data compression algorithms, before they are encrypted. This approach of performing encryption after data compression, which is called encompression, can potentially reduce the volume of data that needs to be processed by cryptographic algorithms. Unfortunately, this approach is not directly applicable to sensor networks, since traditional compression algorithms are themselves quite compute- and memory-intensive. However, as described herein, compression methods, such as, for example, compressive sensing (CS), can be effectively used for data compression in sensor networks, since they each offer a low-complexity compression scheme that still achieves high compression ratios for sparse data (often, over an order-of-magnitude). Further, the addition of inference, for example, employing a feature extraction and/or a linear or nonlinear classification component allows for the incorporation of computational complexity to the sensor while maintaining energy efficiency.

By applying encompression, inference, and encryption, and targeting a reasonable compression ratio, secure sensor data transmission can be achieved, while at the same time, the amount of data to be encrypted or hashed is significantly reduced. Moreover, encompression based on compressive sensing (CS) is especially suitable for sensor nodes and greatly reduces the energy cost of security. In some cases, encompression and inference even reduce energy compared to the case when no compression or encryption is performed or where the analytics are performed at the base station.

Information sensing and processing have traditionally relied on the Nyquist-Shannon sampling theorem that is one of the central tenets of digital signal processing. However, if the signal to be measured is sparse, Nyquist sampling produces a large number of redundant digital samples, which are costly to wirelessly transmit and severely limit the sensor node lifetime.

The Compressive Sensing (CS) method removes redundancies in sparse signals while sampling, thus unifying sampling and compression.

In addition to compression and reconstruction, CS may intrinsically provide a level of confidentiality given that the adversary has no knowledge of matrix $\Phi$. However, to ensure a more robust level of security, CS may be combined with well-established cryptographic algorithms, while greatly reducing their energy overhead.

Compressive sensing is a technique that can be used to compress an N-sample signal x, which is sparse in a secondary basis $\Psi$; e.g., EEG is sparse in the Gabor basis and spike data are sparse in the wavelet basis; the sparse dictionary $\Psi$ can be learned by training on the data, and such data-driven bases often outperform pre-defined fixed dictionaries. Thus, if x can be represented as $\Psi$s, where s is a vector of C-sparse coefficients, a projection matrix $\Phi$ can be used to transform x to a set of $M[O\{C \log(N/C)\} < M << N]$ compressed samples (denoted by $\hat{x}$) as follows:

$$\hat{x}_{M \times 1} = \Phi_{M \times N} x_{N \times 1}. \quad (1)$$

The compression factor $\xi = N/M$ quantifies the amount of compression achieved by the projection. For accurate recovery of x from $\hat{x}$, $\Phi$ needs to be incoherent with $\Psi$; an M×N dimensional matrix $\Phi$, whose entries are i.i.d. samples from the uniform distribution U(+1, −1) or from the normal distribution N(0, 1), is often maximally incoherent with $\Psi$. Deriving $\Phi$ from U(+1, −1) also leads to low-energy compression since the projection is reduced to simple additions and subtractions.

Although sensing can thus incur very little energy, the reconstruction of x from $\hat{x}$ can be costly. As seen from Eq. (1), $\hat{x}$ is underdetermined (i.e., knowing only $\hat{x}$ and $\Phi$, there are an infinite number of possible solutions for x and, hence, for s). However, since x is sparse in $\Psi$, the sparsest solution for s is often the correct solution with high probability. The sparse solution can be determined by solving the following convex optimization problem:

$$\text{minimize} \|s\|_1 \text{ subject to } \hat{x} = \Phi \psi s, \quad (2)$$

The reconstructed signal is then given by $x_R = \Psi s^*$, where $s^*$ is the optimal solution to Eq. (2). Although Eq. (2) requires only a small number of measurements (M<<N) to enable accurate recovery, even with the most efficient approach, the complexity of solving the optimization problem can be prohibitive on typical power-constrained platforms, such as sensor nodes.

While the combination of CS with cryptographic algorithms as described herein allows for a greater level of security for sensor data that is transmitted from the sensor to another location, such as, for example, another sensor or a base station, it also provides for an overall reduction in energy consumption. Another sensor feature that can be enhanced and/or additional functionality provided is the ability of the sensor to compress data at the sensor level, as compared to current sensors that send uncompressed data to a base station. As described below, such data compression can be accomplished at the sensor level with energy savings. However, the prevalent thinking is that even where compression can be accomplished at the sensor level using energy saving techniques, encrypting such data would forfeit all of the energy savings benefits plus require additional levels of energy consumption resulting in an ineffective and inefficient sensor for low power applications. Using the techniques described herein, a low power sensor and a method for low power sensing is provided that allows for both compression, encryption and security at the sensor level, thereby providing a sensor that can provide compressed and encrypted and secure data, such as, for example, to another sensor, a base station or some other remote location.

The following is a description of one or more embodiments of a hardware encompressor module that performs compressive sensing (CS), encryption, and integrity checking at lower energy consumption rates than traditional systems. For example, CS can reduce the energy needed for securing output data using hardware block ciphers and hash functions, under one or more appropriate compression ratio and hardware compressor implementations.

One embodiment of an encompressor process is shown in FIG. 1. As shown in step 102, the signal samples are first compressed using CS. The compressed signal samples are then processed using inference that uses a model derived using machine learning, as shown in step 104. Next, the compressed and processed signal samples are encrypted, as shown in step 106, such as, for example, by using a symmetric encryption algorithm. This algorithm can be an algorithm such as, for example, the Advanced Encryption Standard (AES). In parallel with the encrypting, sequentially, or partially overlapping, but before being sent over the channel, in step 108, the compressed, processed, and encrypted signal samples are also integrity-protected using a cryptographic hash algorithm such as the Secure Hash Algorithm (SHA-3), to prevent malicious modifications. Upon completion of the foregoing actions, the modified (compressed, processed, encrypted, and integrity protected) signal samples 110 are then available for further use. Such use can include, for example, transmission to another sensor, a base station, a server or for processing the modified data.

Figure 2:
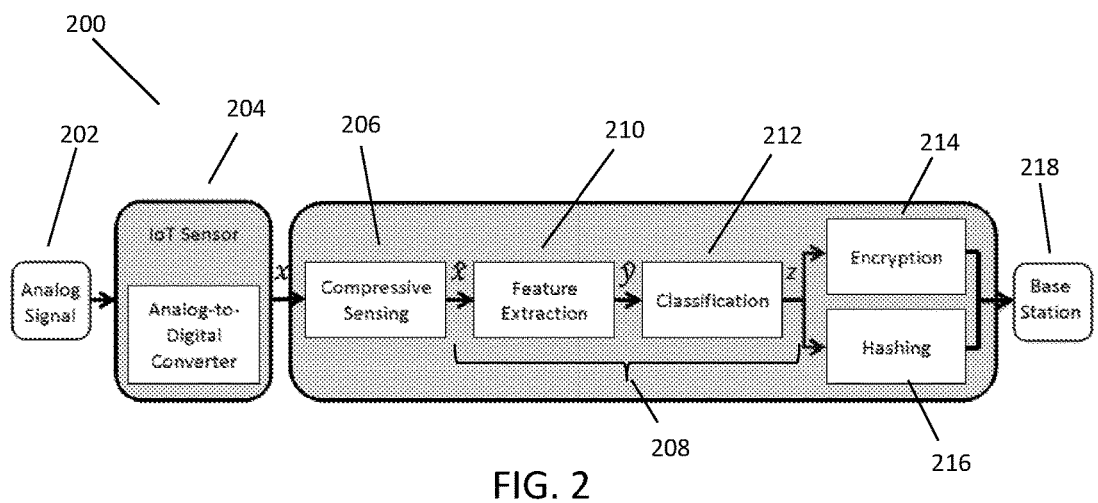
FIG. 2 shows a system architecture according to an embodiment of the present disclosure.

In one or more embodiments, the system architecture incorporates compression, such as, for example, encompression, inference, such as, for example, feature extraction (FE) and classification (CL), after the compression component, such as, for example, compressive sensing, as shown in FIG. 2. These processing components or elements, which can be implemented in software, hardware or as a combination of both, utilize the output from the compressive sensing component or element 206. A system incorporating a low power sensor 200 is shown in FIG. 2. An analog signal 202 is received or detected by the sensor 200 and is routed to an analog-to-digital converter 204. The analog-to-digital converter 204 converts the analog signal 202 to a digital N-sample signal x. Digital N-sample signal x is routed to the compressive sensing component or element 206. The compressive sensing component or element 206 may be implemented in hardware, in software or as a combination of hardware and software. The compressive sensing component or element 206 will be described in greater detail below. As described above, the compressive sensing component or element 206 transforms x to a set of M (O{C log (N/C)}<M<<N) compressed samples (denoted by x̂). Upon completion of the compressive sensing, an output x̂ is directed to the inference component or element 208. The inference component or element 208 transforms data into the Euclidean space, for example, by employing a feature extraction component or element 210 which performs one or more signal-processing functions. The feature extraction component or element 210 generates an output ŷ from input x̂, where ŷ represents a compressed-domain feature vector. As part of the inference component or element 208, a linear or nonlinear classification component or element 212 may be used to perform inference over the data. The classification component or element 212 generates an output z, where z is a filtered signal of N samples. Each of the machine learning component or element 208, the feature extraction component or element 210 and/or the linear or nonlinear classification component or element 212, may be implemented in hardware, in software or as a combination of hardware and software. For example, a support vector machine may be used for the classification component or element 212. The output z is routed to the encryption component or element 214. Before the output of the encryption component or element 214 is sent to the base station 218, the output z is integrity-protected at the hashing component or element 216, for example, using a cryptographic hash algorithm. Each of the encryption component or element 214 and the hashing component or element 216 may be implemented in hardware, in software or as a combination of hardware and software.

In an embodiment, CS is used to enable both sensing and compression. An efficient implementation of CS can be achieved by merging the sampling and compression steps. In one embodiment, compression occurs in the analog sensor read-out electronics prior to the use of an analog-to-digital converter (ADC). In another embodiment, a digital CS is used, where the compression algorithm is applied linearly after the ADC, and the ADC is not included as part of the encompressor. As Eq. (1) implies, in one embodiment, a compression process simply consists of multiplying the input vector with a random matrix. Therefore, the number of multiplications (and thus the corresponding energy consumption) depends on the matrix size, i.e., the product of projection matrix (Φ) and input (x) size.

Figure 3:
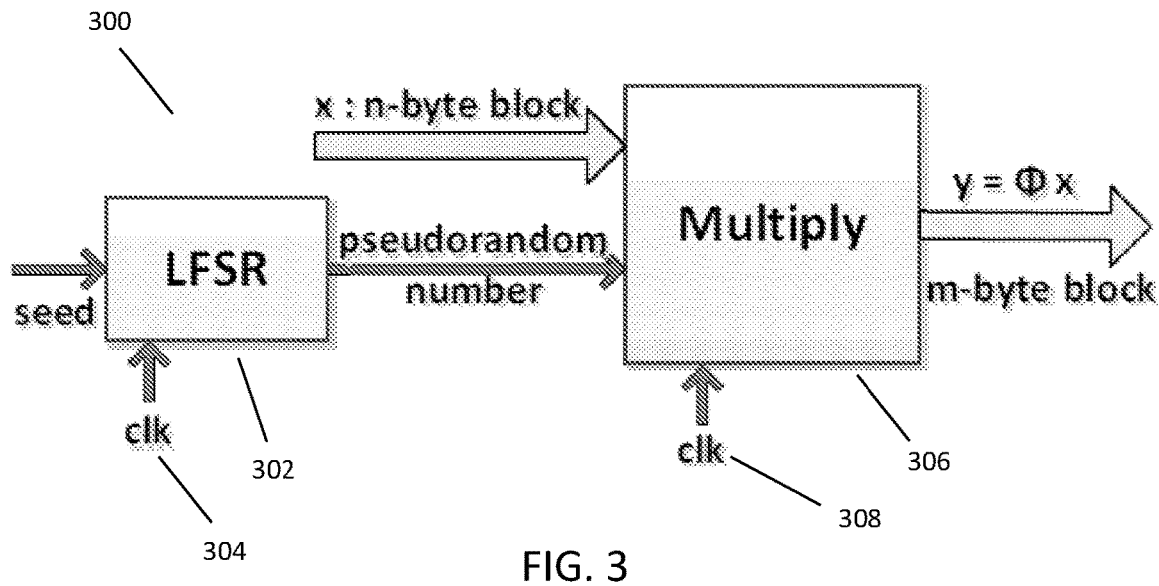
FIG. 3 shows an embodiment of a compression hardware overview.

FIG. 3 presents a top-level view of one possible embodiment of a compression component 300. A linear feedback shift register 302 is used to create a random matrix Φ using a seed input. Inputs are partitioned into blocks of n bytes and processed serially by the linear feedback shift register 302. The linear feedback shift register 302 includes a clock input 304 for controlling the timing of the shift register 302. The linear feedback shift register 302 generates a pseudorandom number which is used to convert the n-byte block input into an m-byte block output at a multiplier 306. The output block size m is determined by n and the compression ratio r. Therefore, the circuit will differ slightly for various combinations of n and r. The inputs are multiplied using the multiplier 306 controlled by a clock input 308.

Figures 4A, 4B, 4C:
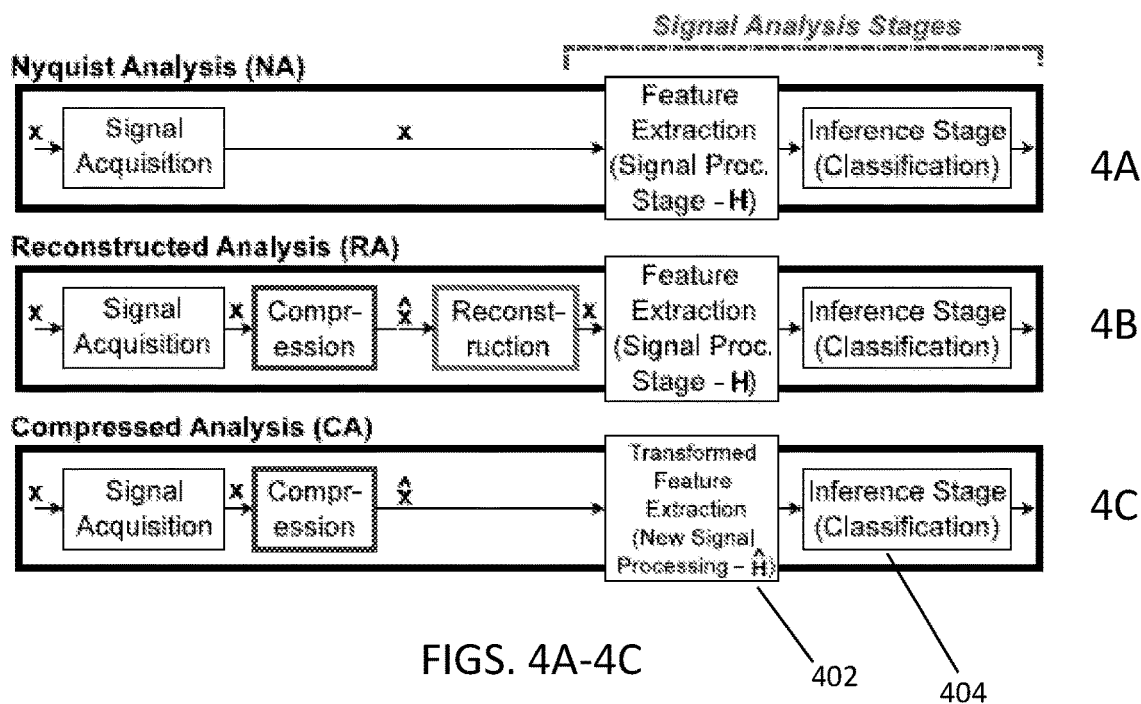
FIGS. 4A-4C show the processing stages used in various approaches for signal processing prior to the encryption/integrity protection stage according to one or more embodiments of the present disclosure.

Next, feature extraction is implemented. FIGS. 4A, 4B, and 4C show the processing stages used in each of three approaches identified below for signal processing prior to the encryption/integrity protection stage used in one or more embodiments of the present system. First, in FIG. 4A, Nyquist analysis (NA) is defined as the usual approach wherein the embedded signals are time-domain representations obtained through Nyquist sampling. Second, in FIG. 4B, reconstructed analysis (RA) is defined as an alternate approach wherein a compressed signal representation is initially received, but is then reconstructed before processing (which is represented by the matrix transformation H). RA corresponds to the system model most commonly used with frameworks like compressive sensing. Third, in FIG. 4C, compressed analysis (CA), which is the approach used in the present embodiment, is defined as wherein the end-to-end embedded signals are representations based on compressive sensing. Since the proposed methodology aims to explicitly enable energy-accuracy trade-offs in signal processing, comparisons between CA and RA will allow for the isolation of the impact on accuracy due to these trade-offs from the impact on accuracy due to compression of the initial signal. Embedded signals are processed by a feature-extraction stage 402. The extracted features are used to develop classification models and perform classification via an inference stage 404. From there, the signals are sent to the encryption/integrity protection stage which ensures that the sensitive data is not compromised or accessed by unauthorized parties. In CA, new signal-processing matrix (Ĥ) is derived that enables the system to obtain a representation of the targeted features (with minimal distortion errors) directly from the compressively-sensed signals. Thus, CA completely avoids signal reconstruction. From a computational complexity point of view, in CA the derivation of Ĥ needs to be done offline only once. This differs from other systems, such as, for example, reconstructed analysis (RA), where signal reconstruction must be accomplished online for every incoming data vector, which can be extremely energy-intensive.

In order to derive the signal-processing operations required in the feature-extraction stage of compressed analysis (CA), which is the approach used in the present embodiment, defined as wherein the end-to-end embedded signals are representations based on compressive sensing, certain calculations must be performed. Compressed-domain equivalents $\hat{H}$ for any signal-processing function can be derived, which can be represented as a matrix operation H. The error in the inner product between feature vectors is minimized, since, as described below, this is a key computation in kernel functions for inference stages like classifiers. Using $\hat{H}$ permits low distortion errors with respect to the inner-products between feature vectors.

Many powerful inference frameworks from the domain of machine learning transform data into the Euclidean space by employing signal-processing functions for feature extraction. These frameworks then use linear or nonlinear classification to perform inference over the data. The classification step commonly utilizes a distance metric, such as, for example, 2-norm or inner product in the Euclidean space, between feature vectors, i.e., classification can be achieved with only inner-product information, rather than complete feature data. For example, in prior systems, as shown in FIG. 4A, in Nyquist analysis (NA), an N-dimensional signal x is multiplied with an N×N matrix operator H to perform linear processing that derives a feature vector y in the Euclidean space. In CA, however, as shown in FIG. 4B, representing signal processing as a matrix transformation enables the mathematics required to develop the CA methodology. As an example, to realize FIR filtering of time-domain signals (as in NA), H is simply selected to implement convolution, wherein each row is a shifted version of the system impulse response, thus realizing the multiply-accumulate-shift operations required. The inner product of y with other feature vectors is then used as the distance metric for classifying the input signal x. Extending this to CA, in the feature extraction section or module 502 compressed representations of the input signal, namely $\hat{x}=\Phi x$, where $\Phi$ represents the M×N random-projection matrix used for compressive sensing are processed. The goal is to identify a matrix transformation $\hat{H}$ that leads to a representation of a signal with the intended signal processing, but derived by directly using $\hat{x}$.

One possibility is for each vector $\hat{x}$ in CA to be processed by a matrix operator $\hat{H}$ to derive the compressed-domain feature vector $\hat{y}$. A naive approach might be to find $\hat{H}$ such that the output vector $\hat{y}$ equals y from NA. This gives the following formulation:

$$y = \hat{y} \implies Hx = \hat{H}\hat{x} \implies Hx = \hat{H}\Phi x \implies \qquad (3)$$

$$H = \hat{H}\Phi$$

$$N \times N \quad N \times M \quad M \times N$$

However, with M<<N, matrix $\hat{H}$ above corresponds to N×M variables constrained by N×N equations. Such a system with fewer variables than equations is overdetermined and has no exact solution. An auxiliary matrix $\Theta$ can be used instead of $\Phi$ to introduce additional degrees of freedom in order to solve for $\hat{H}$ exactly. Instead of solving for $y=\hat{y}$, as shown above in Eq. (3), the system solves for some K-dimensional projection $\Theta y$ of y. The elements of the K×N auxiliary matrix $\Theta$ are now design variables along with $\hat{H}$. Thus, the system needs to solve for $\Theta$ and $\hat{H}$ simultaneously in the following equation:

$$\Theta y = \hat{y} \implies \Theta Hx = \hat{H}\Phi x \implies \Theta H = \hat{H}\Phi \qquad (4)$$

$$K \times N \quad N \times N \quad K \times M \quad M \times N$$

With M<<N, $\Theta$ and $\hat{H}$ together correspond to K×(N+M) variables constrained by K×N equations. Thus, with more variables than constraints, Eq. (4) will have an infinite number of solutions. The system then sets constraints for finding unique solutions that make several useful design options available:

The system is able to solve exactly for the compressed-domain processing matrix $\hat{H}$, avoiding additional error sources in the processing.

By using a smaller value of K, it also permits solving for an approximate $\hat{H}$ of smaller size. This solution provides the system with a knob to scale the number of computations performed in CA based on the required accuracy for solving Eq. (4).

Additionally, by introducing $\Theta$, Eq. (4) allows the system to extend the methodology from signal-processing operations where H is a square matrix to those where H is a non-square matrix (e.g., multi-rate system).

For any signal-processing function, which can be represented as a matrix H, the system derives an equivalent operator $\hat{H}$ in CA. Since the system is not interested in the exact value of y but in its distance from other processed signals, the system solves for a random projection of y, which preserves the inner product of vectors.

Encompression in Hardware:

The intuition behind solving for a projection of y instead of y itself in Eq. (4) is that many machine-learning stages, such as, for example, support-vector machines, that act after feature extraction do not use the exact value of y but only its distance from other vectors. Thus, the Euclidean distance between feature vectors is the metric that is sought to be preserved. The distance between any two feature vectors, $y_1$ and $y_2$, is given by the inner product: $y_1^T y_2$. The corresponding distance in the compressed domain is given by:

$$\hat{y}_1^T \hat{y}_2 \Rightarrow (\Theta y_1)^T (\Theta y_2) \Rightarrow y_1^T (\Theta^T \Theta) y_2 \qquad (5)$$

The right hand side will be equal to the inner product $y_1^T y_2$ of NA if $\Theta^T \Theta$ is equal to the N×N identity matrix I. Thus, to solve for $\Theta$ and $\hat{H}$ exactly in Eq. (4), requires solving the following constrained optimization problem:

$$\arg\min_\Theta \|(\Theta^T \Theta) - I\|_2^2 \text{ such that } \Theta H = \hat{H}\Phi \qquad (6)$$

Assuming H is a square matrix, the SVD of $\Phi H^{-1}$ as $VSU^T$, can be obtained where V and U are orthogonal matrices (i.e., $U^T U = V^T V = I$) and S is an M×M diagonal matrix formed by the singular values of $\Phi H^{-1}$. The following is then the relationship for $\Theta^T \Theta$:

$$\Theta^T \Theta = (\hat{H}\Phi H^{-1})^T \hat{H}\Phi H^{-1} = U(SV^T \hat{H}^T \hat{H} VS)U^T \qquad (7)$$

The distance from the above matrix to the identity will be at least the rank deficiency of U. The lower bound in Eq. (6) will thus be achieved by setting K=M (or v=ξ), $$\hat{H}=S^{-1}V^T \text{ and } \Theta=\hat{H}\Phi H^{-1} \quad (8)$$

According to the Johnson-Lindenstrauss (JL) lemma (S. Dasgupta and A. Gupta, "An elementary proof of the Johnson-Lindenstrauss lemma," *Random Structures and Algorithms*, vol. 22, no. 1, pp. 60-65, 2002, incorporated herein by reference in its entirety for all purposes), $\hat{y}_1^T\hat{y}_2$ in Eq. (5) will be approximately equal to $y_1^T y_2$, if the entries of the auxiliary matrix $\Theta$ are drawn from the normal distribution $N(0, 1)$. Thus, the following modified problem can be solved. Find $\Theta$ and $\hat{H}$ such that $\Theta H=\hat{H}\Phi$ and $\Theta \sim N(0, 1)$ Suppose $\Theta$ and $\hat{H}$ comprise row vectors $\theta_i^T$ and $\hat{h}_i^T$, $i \in [1, K]$, where $\theta_i^T \in \mathbb{R}^N$ and $\hat{h}_i^T \in \mathbb{R}^M$. The following representation is used:

$$\Theta = \begin{bmatrix} - \theta_1^T - \\ \vdots \\ - \theta_K^T - \end{bmatrix}_{(K \times N)} \text{ and } \hat{H} = \begin{bmatrix} - \hat{h}_1^T - \\ \vdots \\ - \hat{h}_k^T - \end{bmatrix}_{(K \times M)}$$

Given the above formulation, the ith row of Eq. (4) can be simplified and represented as follows:

$$\theta_i^T H = \hat{h}_i^T \Phi \Rightarrow \theta_i = D\hat{h}_i \quad (9)$$

where $D^T=\Phi H^{-1}$. Note that D in the above equation is of dimensionality N×M. Suppose the SVD of D is $USV^T$, where orthogonal matrices U and V are of dimensionality N×M and M×M, respectively, and the diagonal matrix S, comprising the singular values of D, is of dimensionality M×M. Then Eq. (9) can be simplified as follows:

$$\theta_i = D\hat{h}_i = USV^T\hat{h}_i \quad (10)$$

Since $\theta_i \sim N(0, I_N)$ is sought to preserve the inner products according to the JL lemma, $\hat{h}_i$ is drawn from $N(0, \Sigma)$, where $\Sigma = VS^{-2}V^T$. Then each row of $\Theta$ is derived based on Eq. (10). This choice of $\hat{h}_i$, in fact, gives the exact JL solution for $\hat{H}$ according to the following corollary:

Given orthogonal matrices U, V of dimension N×M and M×M, respectively, and an M×M diagonal matrix of singular values S. Then, $\hat{h}_i \sim N(0, \Sigma)$, where $\Sigma = VS^{-2}V^T$ and $\hat{h}_i \in \mathbb{R}^M$, gives the solution for $\theta_i = USV^T\hat{h}_i$ such that the entries of the row vector $\theta_i$ are drawn i.i.d from the multivariate normal $N(0, I_N)$.

The proof is completed by deriving the mean and variance of $\hat{h}_i$, under the assumption of $\theta_i \sim N(0, I_M)$. Consider the following equation:

$$\theta_i = USV^T\hat{h}_i = Uz_i \quad (11)$$

where $z_i = SV^T\hat{h}_i$ is an M-dimensional vector of random variables. Since $\theta_i \sim N(0, I_M)$ and U is a constant matrix, $z_i \sim N(0, I_N)$. Further, since $\hat{h}_i = VS^{-1}z_i$, the mean of $\hat{h}_i$ can be computed as $\mathbb{E}[\hat{h}_i] = \mathbb{E}[z_i] = 0$, and the variance of $\hat{h}_i$ as follows:

$$\mathbb{E}[\hat{h}_i \hat{h}_i^T] = \mathbb{E}[VS^{-1}z_i z_i^T S^{-1}V^T]$$
$$= VS^{-1}\mathbb{E}[z_i z_i^T]S^{-1}V^T$$
$$= VS^{-2}V^T$$

Thus, the approximate solution for matrix $\hat{H}$ is of dimension K×M, where K<M (or v>ξ).

To solve Eq. (6) for $\Theta$ and $\hat{H}$, the transpose of Eq. (4) is taken and multiplied with itself, obtaining the following relationship:

$$(\Theta H)^T(\Theta H)=(\hat{H}\Phi)^T(\hat{H}\Phi)$$

$$H^T\Theta^T\Theta H=\Phi^T\hat{H}^T\hat{H}\Phi$$

$$RQP^T\Theta^T\Theta PQR^T=USV^T\hat{H}^T\hat{H}VSU^T \quad (12)$$

where $H=PQR^T$ and $\Phi=VSU^T$ are the SVDs of H and $\Phi$, respectively.

Since H is of dimensionality L×N (L<N), P, Q, and R are of dimensionality L×L, L×L, and N×L, respectively. Similarly, since $\Phi$ is of dimensionality M×N (M<N), U, S, and V are of dimensionality N×M, M×M, and M×M, respectively. If $\Theta=BQ^{-1}P^T$ and $\hat{H}=AS^{-1}V^T$ in Eq. (12), the following relationship is known:

$$RB^TBR^T=UA^TAU^T \Rightarrow U^TRB^TBR^TU=A^TA$$

where A and B are unknown matrices that need to be determined. The JL lemma can be used such that K×L elements of $\Theta$ can be drawn from N(0, 1). A solution for the K×L matrix B=$\Theta$PQ can be obtained and the above equation can be used to derive the K×M matrix A=$BR^TU$. Finally, the K×M matrix $\hat{H}=AS^{-1}V^T$ can be obtained.

The preceding solution is summarized below.

Before proceeding, the dimensionality of $\Theta$ is parameterized and related to the dimensionality of $\hat{H}$; this will ease consideration of the scaling trade-offs related to accuracy and energy. The size of the compressed-domain processing matrix $\hat{H}$ is governed by the size of $\Theta$ and $\Phi$ (see Eq. (4)). Thus, in addition to the compression factor ξ=N/M, a parameter called projection factor v for $\Theta$ is defined as follows:

$$v=N/K. \quad (13)$$

Note that v>1 (<1) denotes a compressive (expansive) projection $\Theta$. Similarly, ξ>1 (<1) denotes a compressive (expansive) projection $\Phi$. These, in turn, imply fewer (more) computations associated with $\hat{H}$.

Assuming H is a square matrix, such as, for example, discrete wavelet transform (DWT) in NA, the following is a solution for Eq. (6), above. Setting K=M (or v=ξ) leads to a minimum error solution and results in the following relationships:

$$\hat{H}=S^{-1}V^T \text{ and } \Theta=\hat{H}\Phi H^{-1} \quad (14)$$

The solutions for $\Theta$ and $\hat{H}$ have dimensionality M×N and M×M (M<<N due to compression), respectively. Processing vectors in CA (with an $\hat{H}$ that is smaller than H) would thus reduce the number of computations as compared to NA.

Above, is described a solution for $\Theta$ and an approximate $\hat{H}$ to save more computational energy in CA.

To derive the approximate solution, JL lemma states that the inner product of vectors is preserved under random projections. The results show that $\Theta=(\Phi H^{-1})^T\hat{H}$ and each row of $\hat{H}$ needs to be derived from the normal distribution $N(0, \Sigma)$, where $\Sigma=VS^{-2}V^T$; S is a diagonal and V is a unitary matrix obtained from the following singular value decomposition (SVD): $(\Phi H^{-1})^T=USV^T$.

---

Algorithm 1
Find compressed-domain matrix $\hat{H}$

Require: projection dimension K and matrices $\Phi$ and H
Ensure: $\Theta$ and $\hat{H}$ with $\Theta$ H = $\hat{H}\Phi$
1:    Init: N ← # cols($\phi$); M ← # rows($\phi$); L ← # rows(H);
2:    if L = N then
3:        $D^T := \Phi H^{-1}$; $USV^T$ ← SVD(D); {for $\theta_i = D\hat{h}_i$}

-continued

Algorithm 1
Find compressed-domain matrix $\hat{H}$

```
 4:        if K = M then
 5:            Ĥ = √(N/M) (S⁻¹Vᵀ); Θ = √(N/M)(ĤΦH⁻¹);
 6:        else
 7:            for i = 1 to K do
 8:                xᵢ~N(0,I_M)/√(K); {for ĥᵢ~N(0, VS⁻²Vᵀ)}
 9:                ĥᵢ = VS⁻¹xᵢ; θᵢ = Uxᵢ;
10:            end for
11:            Θ = √(N/M) (θᵢᵀ; ...; θₖᵀ); Ĥ√(N/M) (ĥᵢᵀ; ...; ĥₖᵀ);
12:        end if
13:    else
14:        PQRᵀ ← SVD(H); VSUᵀ ← SVD(Φ);
15:        Θ~N(0.1)/√(NK/M); {ortho(Θ)if K > L}
16:        B = ΘPQ; A = BRᵀU; Ĥ = N/M(AS⁻¹Vᵀ);
17:    end if
```

In this case, the solutions for $\Theta$ and $\hat{H}$ have dimensionality $K \times N$ and $K \times M$ (where K can be chosen to be smaller than M or $v > \xi$), respectively. Such an approach (with a much smaller $\hat{H}$ matrix) would reduce the number of computations in CA below those required for the exact solution and save additional computational energy. This energy saving comes at the cost of accuracy in solving Eq. (6). However, as described below, this cost can be small and, in fact, $K \ll M$ ($v \gg \xi$) can be reliably used.

This approach is also applicable to multi-rate signal-processing systems, and Eq. (6) is solved when H is a non-square matrix.

For the case when H is of dimensionality $L \times N$ ($L \neq N$), the JL lemma is used to derive a near-orthogonal matrix $\Theta$ and solve for $\hat{H}$ using the SVDs of H and $\Phi$. The derivation is presented above, where $\Theta$ is shown to be that of dimensionality $K \times L$ and its elements are drawn from $N(0, 1)$. It is also shown that $\hat{H} = \Theta H U S^{-1} V^T$, where U, S, and V are derived from the SVD: $\Phi = V S U^T$.

Algorithm 1 shows the pseudocode (with the correct scaling constants) that summarizes an approach of simultaneously solving for $\Theta$ and $\hat{H}$ under the three conditions described in this section. For the case of a non-square $L \times N$ ($L > N$) processing matrix H, Algorithm 1 also shows (on line 15) an optional step of orthogonalization, such as, for example, by the Gram-Schmidt process, before deriving B, A, and $\hat{H}$. This ensures a perfectly orthonormal $\Theta$ when its row rank is greater than the column rank. Next, system-level metrics are described that will be used to evaluate an approach in CA.

Figures 5A, 5B:
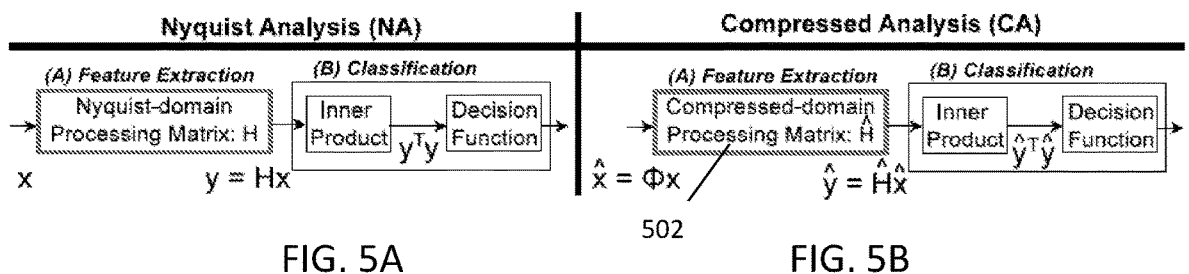
FIG. 5A shows an example of Nyquist analysis.
FIG. 5B shows a Compressed analysis according to an embodiment of the present disclosure.

FIG. 5A shows an example of a Nyquist analysis, while FIG. 5B shows a Compressed Analysis, each according to an embodiment of the present disclosure.

Figure 6:
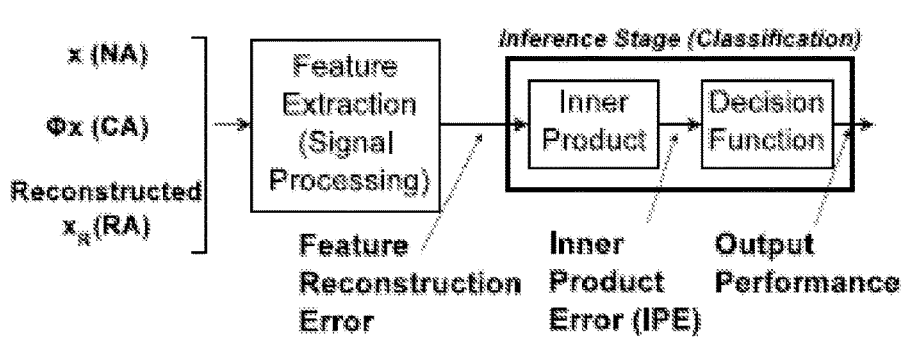
FIG. 6 shows an embodiment of metrics used to evaluate the performance of Nyquist analysis (NA), reconstructed analysis (RA), and compressed analysis (CA).

The approach above opens up many system design options. To understand the associated accuracy trade-offs, below, the precise metrics that are relevant in inference applications are discussed. In addition to comparing the proposed CA with NA as a baseline approach, CA is also compared with RA in which the sensor node transmits compressed data to an external platform to reduce the amount of data transmitted (hence, saving communication energy and/or alleviating bandwidth constraints); the data are reconstructed on the external platform before performing signal processing. FIG. 6 shows the metrics used. Since CA is solving for a random projection $\Theta$ of the feature vector (see Eq. (4)), there is an expectation that it will be able to reconstruct the signal features accurately. Thus, the feature vectors in CA are reconstructed and compared with the features extracted from reconstructed signals in RA. The variation in the inner-product error (IPE) and the accuracy of the inference stage are also compared with respect to both $\xi$ and v.

Since CA solves for a projection of the processed signal ($\Theta y$) in NA, the accuracy of processing in CA is expected to be correlated with the ability to recover the y features from $\Theta y$. If the reconstructed features are denoted as $y^*_{CA}$, the SNR in CA can be defined as follows:

$$SNR_{CA} = 10 \cdot \log[\|y\|_2^2/(\|y^*_{CA} - y\|_2^2)] \text{ dB.} \quad (15)$$

Similarly, the performance in RA is governed by the ability to recover the $y^*_{RA}$ features. However, since reconstruction occurs before processing in RA, the reconstructed features $y^*_{RA}$ are related to the reconstructed signal $x^*_{RA}$ as $y^*_{RA} = H x^*_{RA}$. Thus, the SNR in RA can be defined as follows:

$$SNR_{RA} = 10 \cdot \log[\|y\|_2^2/(\|Hx^*_{RA} - y\|_2^2)] \text{ dB.} \quad (16)$$

For feature extraction and classification, a primary concern is how the IPE of feature vectors scales with $\xi$. For any two feature vectors $y_i$ and $y_j$, IPE between the inner product in CA (i.e., $\hat{y}_i^T \hat{y}_j$) and the inner product in NA (i.e., $y_i^T y_j$) is given by the following equation:

$$IPE = |\hat{y}_i^T \hat{y}_j - y_i^T y_j|/(y_i^T y_j) \quad (17)$$

The scaling characteristics of IPE with respect to the dimensionality of $\Theta$ is analyzed below. There are trade-offs, for example, for a spike-sorting application and for a seizure detection application.

As discussed below, scaling of the first dimension K (or v) of $\hat{H}$ and $\Theta$ degrades IPE. If it degrades at a slow rate, it enables a smaller $\hat{H}$ and hence, reduces the amount of computation significantly. The rate of degradation can be quantified by invoking the distance-preservation guarantees as described in M. Rudelson and R. Vershynin, "Non-asymptotic theory of random matrices: Extreme singular values," *arXiv preprint arXiv:* 1003.2990, April 2010 ("Rudelson"), incorporated herein by reference in its entirety for all purposes. For an input vector x, the following relationship exists (from the near-orthogonality of $\Theta$):

$$\|\Theta x\| \approx \|UU^T x\| \quad (18)$$

However, since $\phi$ is a random projection, as described in Rudelson, $\|UU^T x\| \approx \|x\|$.

As shown below, the measured IPE degrades at a slow rate when K is decreased (v is increased).

Because $\xi = N/M$ quantifies the amount of compression achieved by compressive sensing, as $\xi$ becomes larger, the performance of RA and CA is expected to deteriorate with respect to NA. The present innovation provides for computations to be viably performed on the sensor node, with the additional benefit of computational energy reduction (due to the fewer operations required in CA). As described below, the present innovation to energy-constrained sensor nodes, where devices can be more computationally powerful, thanks to energy savings enabled by the explicit use of efficient representations for the embedded signals, can be exploited alongside algorithmic and architectural optimizations.

While v=N/K provides a knob to obtain additional computational energy savings in the CA approach since the approximate solution permits a smaller $\hat{H}$ matrix, these energy savings come at the cost of accuracy. The impact on performance and computational energy if v and $\xi$ knobs are turned simultaneously is shown below. Also shown below is a comparison of the accuracy and energy savings to a case where an exact solution is used for $\hat{H}$.

In sensing systems, communication bandwidth, not just communication energy, may be of concern. A passive implant functioning as a spike-acquisition transponder is a typical example of such a case. This is a case where communication poses a bandwidth limitation, not an energy limitation, since the implant transmits with no power. In this case, the implant is severely energy-constrained, and thus unable to accommodate extensive local processing. On the other hand, for communication, it can take advantage of a passive transmitter based on (inductive) backscattering. The data-rate of such a transmitter, however, is limited (due to practical inductors that can be formed). The objective within the implant is thus to reduce the data rate to a level that can be supported by the passive transmitter while consuming no more energy than that required to achieve this level. An embodiment as described herein substantially improves the accuracy of the signal-processing system and enables two knobs for trading algorithmic performance in exchange for reduced computational complexity. The energy savings are linear with respect to each of these knobs.

In an exemplary control system for neural prosthesis, a passive transponder is used to transmit spike data serially, thus requiring buffering over all channels, at data rates up to 1 Mbps. Thus, spikes on the implant can be detected and aligned before transmission. This can significantly reduce the data rates. Spikes are sorted on an external head-stage before analysis, which comprises feature extraction and clustering. For example, DWT and K-means are two algorithms that can be used for feature extraction and clustering, respectively. After sorting, the data rates can become significantly lower. Spike trains from each sorted cluster can then be analyzed to extract statistical parameters, such as, for example, the spike count (SC), neuron firing rate (FR), inter-spike interval (ISI), and coefficient of variation (CV). These parameters eventually steer an algorithm for prosthesis control.

In CA, spikes on the implant are detected and aligned. Each detected spike is compressively sensed through random projections. This process can potentially help alleviate the bandwidth requirements of a passive transponder. Spike sorting is then performed directly on compressively-sensed data. This can be done either on the external head-stage or on the implant itself. If done on the implant, it permits real-time operation by avoiding reconstruction, while potentially reducing the computational energy of spike sorting. The results below suggest that the computational energy can be reduced substantially. If done on the head-stage, CA can reduce the communication constraints of the implant drastically (due to compressive sensing). This implies that low-energy or zero-energy communication links, such as, for example, based on passive impedance modulation, may be viable. The cost is only a small increase in computational energy (for the random projection of data) on the implant.

Figures 7A, 7B:
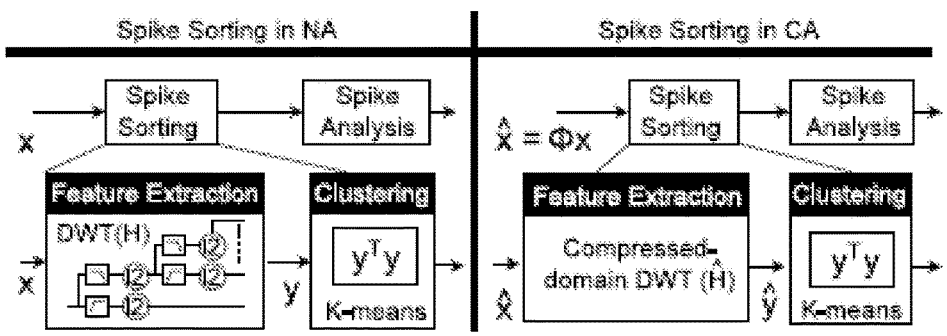
FIG. 7A shows a discrete wavelet transform (DWT) feature extraction in a neural-prosthesis system when formulated as a matrix H in NA.
FIG. 7B shows an embodiment of a DWT feature extraction in a neural-prosthesis system when formulated as a matrix Ĥ as derived for CA.

FIG. 7A shows the computations that are focused on for spike sorting and analysis. The DWT function shown can be implemented as a filter bank. To enable a transformation to CA, however, it is preferable that DWT be formulated as a matrix operation H.

In the filter bank implementation, the DWT of a signal is derived by passing it through a series of filters. First, vector x is passed through a low pass filter (LPF) through convolution. The signal is also decomposed simultaneously using a high-pass filter (HPF). However, with half the frequency band removed, the outputs can be down-sampled by 2× without risk of aliasing. This comprises one level of wavelet decomposition. The process is repeated with the LPF outputs to achieve higher levels of decomposition. To formulate the entire process as a matrix operation in NA, the processing between a vector of filter coefficients g and the N-sample spike vector x can be represented as a convolution operation:

$$z = g * x = \sum_{k=-\infty}^{\infty} g[n-k] x[k] = G_N x \quad (19)$$

where z is the filtered signal of N samples and $G_N$ is the N×N convolution matrix whose rows are shifted versions of the coefficient vector g. For the DWT algorithm, $G_N^L$ and $G_N^H$ can be used to represent the LPF and HPF operations, respectively. After the filtering process, down-sampling can be implemented by 2× at each level of decomposition through an N/2×N matrix $D_{2,N}$:

$$D_{2,N} = \begin{bmatrix} 1 & 0 & 0 & 0 & \ldots & 0 \\ 0 & 0 & 1 & 0 & \ldots & 0 \\ \vdots & & & & \ddots & \\ 0 & 0 & 0 & 0 & \ldots & 1 \end{bmatrix}$$

$$= \left( \frac{N}{2} \times N \right)$$

Using a cascade of D-G operators, the full DWT operation can be represented in NA as the following linear transformation:

$$y = Hx = \begin{bmatrix} H_1 \\ H_2 \\ \vdots \\ H_{L+1} \end{bmatrix}_{N \times N} [X]_{N \times 1} \quad (20)$$

where y is the N-sample DWT of spike samples x. For L levels of decomposition, sub-matrices $H_n$ ($1 \le n \le L+1$) are given by:

$$H_n = \begin{cases} D_{2,N} G_N^H & \text{if } n = 1 \\ \prod_{k=0}^{n-2} \left( D_{2,N/2^k} G_{N/2^k}^L \right) \left( D_{2,N/2^{n-1}} G_{N/2^{n-1}}^H \right) & \text{if } 2 \le n \le L \\ \prod_{k=0}^{n-1} \left( D_{2,N/2^k} G_{N/2^k}^L \right) & \text{if } n = L+1 \end{cases}$$

Each pair of matrices, $G_{N/2}^L$ and $G_{N/2}^H$, in the above equation is designed to be a quadrature mirror filter based on standard mother wavelets, such as, for example, Haar, Daubechies, Coiflet, or biorthogonal wavelet.

Given the DWT formulation in NA, as shown in FIG. 7B, the corresponding DWT transformation $\hat{H}$ in the compressed domain can be derived based on the approach described above.

Experimental Results:

The spike sorting and analysis systems of FIGS. 7A and 7B were implemented in MATLAB. The experiments used four records (named as E1, E2, D1, and D2) from the dataset in R. Q. Quiroga, Z. Nadasdy, and Y. Ben-Shaul, "Unsupervised spike detection and sorting with wavelets and superparamagnetic clustering," *Neural Comp.*, vol. 16, no. 8, pp. 1661-1687, 2004 ("Quiroga"), incorporated herein by reference in its entirety for all purposes. Each record was processed to detect and align spikes using the thresholding algorithm described in Quiroga. This process results in a window of 64 samples per spike (denoted by vector x). In NA, the detected spikes were then processed by a matrix H to extract specific signal features. H corresponds to the DWT matrix, which is derived from four levels of decomposition of a Haar mother wavelet. In CA and RA, however, the detected spikes are first projected using a matrix $\Phi$ to obtain the compressively-sensed signal $\hat{x}=\Phi x$. Each entry of $\Phi$ is chosen from a uniform distribution $U(-1, +1)$ to facilitate an efficient implementation. In RA, before performing computations, signal $x_R$ is reconstructed from $\hat{x}$ and then H is applied. In CA, however, matrix $\hat{H}$ is directly applied to compressed signal $\hat{x}$. The extracted wavelet features (in NA, RA, and CA) are then sorted into three clusters using the K-means algorithm. Finally, for each spike cluster, SC, CV, and FR are derived.

SC is determined by counting the number of spikes in each cluster after K-means. The first step in computing CV is to determine the ISI histogram. The envelope of the histogram as a Poisson distribution is then modeled. This model is directly used to determine CV, which is defined as the ratio of the standard deviation to the mean of the distribution function of the ISI histogram. To compute FR for each class, the number of spikes, which occur in non-overlapping windows—each of width 300 ms, is determined. Then a Gaussian filter with a length (L) of 30 and variance ($\sigma$) of 3 is used to smooth the binned FR estimates. The bin-width and smoothing filter parameters are chosen empirically to avoid discontinuities in the FR curve. The mean FR is then computed from the smoothed curve. FIGS. 8A, 8B and 8C show the performance of the spike sorting approach in comparison with the ground truth (GT) values. The GT values are obtained using annotations that identify the true cluster association for each spike in the database. The end-to-end performance values for CA and RA (with no compression) are also shown. The performance of all four approaches are close to one another.

Since the performance in CA and RA are related to the ability to reconstruct the feature vectors, the error introduced in each approach is analyzed. FIG. 9 shows the mean SNR computed over spikes in all the four records. It can be observed that the SNR in RA is close to the SNR in CA. Although the ability to reconstruct features governs the performance trends in CA and RA, the inner-product between the features is the key parameter used in the K-means algorithm.

FIG. 10 shows the IPE evaluated from the entire spike database. As can be seen, the IPE in CA is only 19% even at $\xi=24\times$ (RA has a similar error). At $\xi=24\times$, only three compressively-sensed samples per spike are used for CA processing (compared to 64 samples for NA). In RA, gradient projection is used to reconstruct a sparse representation of spikes. Also, IPE was obtained using 10-fold cross-validation on the total spike data. In each iteration, a new sparse dictionary $\Psi$ was learned from K-SVD using 90% of the total spike data.

FIG. 11 shows the IPE in the DWT spike features with respect to $v$ and $\xi$. For the exact solution ($v=\xi$) shown with dark boxes in FIG. 11, IPE is below 19% even at $\xi=24\times$. The figure also indicates that for $\xi<12\times$, $v$ can be scaled up to $15\times$ while retaining the same level of IPE. This saves substantial computational energy in CA with $15\times$ fewer operations associated with $\hat{H}$.

With fewer compressively-sensed samples (i.e., larger $\xi$), accuracy of SC, CV, and FR estimates are expected to deteriorate in RA and CA. Since H is a square processing matrix in the neural prosthesis application, the exact solution for $\hat{H}$ is used. FIG. 12 and Table I show the mean and standard deviation of the estimation errors for CA and RA, respectively. For example, various methods for reconstructing the spikes from $\hat{x}$ could be used. Here, three methods, namely basis pursuit, $l_1$-Magic, and SPG-Lasso were used. However, the results for only basis pursuit, which performs better than the other two algorithms, are shown in FIG. 12 and Table I. Each performance metric was obtained for the exact solution (i.e., $\xi=v$ case). The estimation errors were with respect to GT and averaged over one hundred different choices of $\Phi$. The performance trends for both CA and RA showed only a small variance across $\xi$. The performance degrades gracefully, e.g., even at $\xi=24\times$, the mean estimation errors with respect to GT for SC, CV, and FR are 8.65%, 5.06%, and 9.96% (std. deviation: 0.81%, 0.30%, and 0.89%) in CA and 6.66%, 4.91%, and 7.54% (std. deviation: 0.69%, 0.12%, and 0.92%) in RA, respectively. Thus, the exact solution enables CA to perform nearly as well as RA. Since compression does not introduce significant errors, the spikes can be significantly compressed before transmitting them to the external head-stage.

Figure 13A:
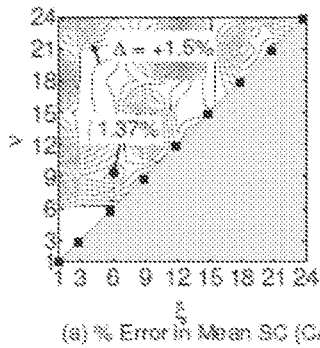
FIG. 13A shows the degradation in SC with increasing values of v, according to an exemplary embodiment.
Figure 13B:
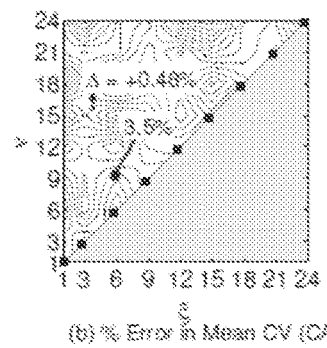
FIG. 13B shows the degradation in CV with increasing values of v, according to an exemplary embodiment.
Figure 13C:
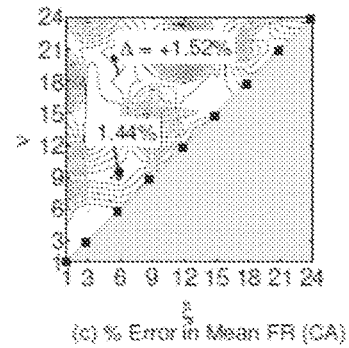
FIG. 13C shows the degradation in FR with increasing values of v, according to an exemplary embodiment.

Since the approximate solution permits a smaller $\hat{H}$ matrix, it enables additional savings in computational energy. However, as described above, due to the approximation required in $\hat{y}$, this can impose a performance cost. FIG. 13 shows trends in performance as the projection factor $v$ and compression factor $\xi$ are simultaneously scaled. The points corresponding to the exact solution for $\hat{x}$ are shown as black squares along the diagonal; as can be seen, this performance corresponds to the IPE trends observed in FIG. 12. FIG. 13 also indicates that the degradation in the three parameters (i.e., SC, CV, and FR) is small with increasing values of $v$. For example, for both SC and FR (left and right plots), $v=9\times$ (at $\xi=6\times$) incurs very little error, yet enables $54\times$ reduction in the size of the transformation matrix for CA processing; CV incurs somewhat higher error, but still quite small ($\leq 3.5\%$). Note that there are several local minima shown in the contour plots of FIG. 13. These minima occur since the performance metrics are dependent on one another; attempting to optimize one metric results in a degradation in others. Ideally, it is preferred to optimize all metrics simultaneously, which is achieved by the exact solution. For fixed $\xi$ and $v$, the local minima tend to remain practically unchanged with different choices of $\hat{H}$ and $\Theta$. This behavior is observed since the JL lemma provides low variance in the IPE values.

As another example, the Nyquist-domain processing matrix H that is considered is non-square. The compressed-domain equivalent matrix $\hat{H}$ is derived using the solution set out above. The Nyquist-domain algorithm for seizure detection is described, which employs patient-specific classifier training.

Figure 14:
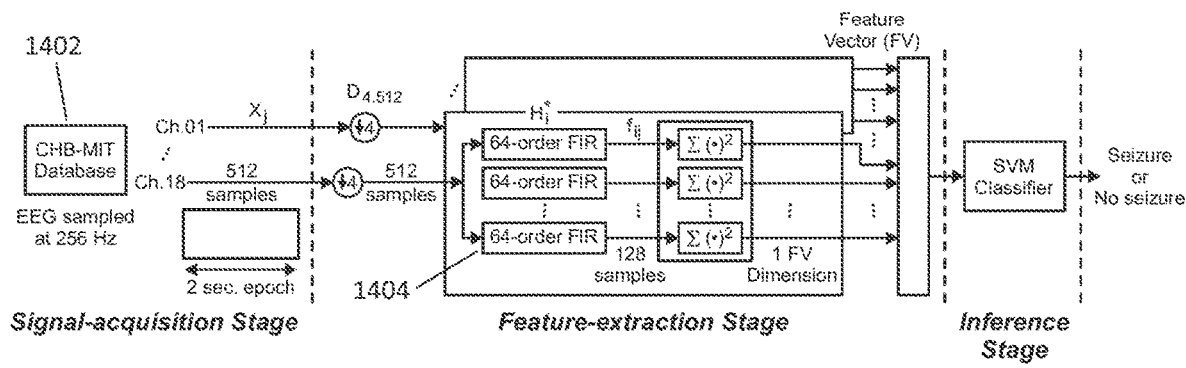
FIG. 14 shows various stages according to an exemplary embodiment.

FIG. 14 shows the baseline algorithm for seizure detection. A two-second epoch from each EEG channel is processed using eight band-pass filters (BPFs) with passbands of 0-3 Hz, 3-6 Hz, . . . , 21-24 Hz. The spectral energy from each filter is then represented by summing the squared value of the output samples to form a feature vector (FV), which is then used for classification by a support-vector machine (SVM) classifier. The feature-extraction process represents a special case of non-linear processing, (i.e., this is handled by deriving a random projection and using the JL lemma to represent the signal energy). Further, since the feature-extraction process for this particular application involves spectral-energy extraction after filtering, the energy in the filtered EEG signal from each filter corresponds to one dimension of the FV. This operation can be represented as an inner-product computation: $y_{ij}=f_{ij}^T f_{ij}$. Relating the entire feature-extraction process with the stages in FIG. 6, there is an additional inner-product computation involved before classification. Thus, for this case study, the IPE metric defined above directly represents the error in the signal features.

The baseline detector in NA was validated on 558 hours of EEG data from 21 patients (corresponding to 148 seizures) in the CHB-MIT database. For every patient, up to 18 channels of continuous EEG was processed using eight BPFs, leading to an FV dimensionality of 144. The Nyquist-domain detector has been demonstrated to achieve an average latency, sensitivity, and specificity of 4.59 sec., 96.03%, and 0.1471 false alarms per hour, respectively.

Experimental Results:

As discussed below, the error in the FVs (represented by IPE) and the performance of the end-to-end system is shown. As can be seen, the performance does not correlate directly with the IPE because the information content of the features is what controls the performance of the system. This behavior, which is unlike the previous case study, is due to the presence of the spectral-energy operation in the feature-extraction stage. Thus, the variation in mutual information with respect to $\xi$ in CA is reviewed and compared with that in RA.

TABLE I

Standard deviation in the performance of spike sorting across one hundred different choices of $\Phi$

| | % Error in SC | | | | | | | | | % Error in CV | | | | |
|---|---|---|---|---|---|---|---|---|---|---|---|---|---|---|
| $\xi =$ | 1x | 3x | 6x | 9x | 12x | 15x | 18x | 21x | 24x | $\xi =$ 1x | 3x | 6x | 9x | 12x |
| CA | 0.03 | 0.04 | 0.10 | 0.25 | 0.65 | 0.73 | 0.62 | 0.84 | 0.81 | 0.02 | 0.01 | 0.02 | 0.08 | 0.12 |
| RA | 0.03 | 0.04 | 0.02 | 0.16 | 0.20 | 0.24 | 0.56 | 0.49 | 0.69 | 0.01 | 0.01 | 0.01 | 0.03 | 0.05 |

| | % Error in CV | | | | % Error in FR | | | | | | | | | |
|---|---|---|---|---|---|---|---|---|---|---|---|---|---|---|
| | 15x | 18x | 21x | 24x | $\xi =$ 1x | 3x | 6x | 9x | 12x | 15x | 18x | 21x | 24x | |
| CA | 0.11 | 0.09 | 0.26 | 0.30 | 0.10 | 0.15 | 0.23 | 0.42 | 0.56 | 0.69 | 1.00 | 0.97 | 0.89 | |
| RA | 0.10 | 0.08 | 0.13 | 0.12 | 0.11 | 0.09 | 0.14 | 0.52 | 0.39 | 0.58 | 0.79 | 0.87 | 0.92 | |

To enable a transformation to the compressed domain, the focus is on computations in the feature-extraction stage of FIG. 14. To enable efficient processing with a low-order FIR filter, the EEG signals are down-sampled before filtering. Since the BPFs in the filter bank have a maximum cutoff frequency of 24 Hz and EEG signals in the CHB-MIT database 1402 are sampled at 256 Hz, the data from each channel is down-sampled by a factor of 4. For each data channel, one EEG epoch (corresponding to 512 Nyquist samples) thus results in 128 decimated samples. These samples are then processed with eight BPFs 1404 of order 64. To represent the BPF computations as a matrix operation, the formulation in Eq. (19) is generalized, for example, as shown above where decimation of an N-sample signal by 2× was handled. A new decimation matrix $D_{4,512}$ is defined, which acts upon a 512-sample EEG epoch to give 128 decimated samples. If one EEG epoch from the $j^{th}$ channel is represented as $x_j$, then $D_{4,512}$ acts upon $x_j$ to provide 128 samples. Further, suppose each 64-order BPF before energy accumulation is represented as a convolution matrix $H^*_i$, $0 \le i \le 7$, of dimensionality 128×128—observe that in $H^*_i$ each row is a shifted version of the previous row. The decimation+filtering operation in the feature-extraction stage can then be represented as the following cascaded operation:

$$f_{ij} = H^*_i D_{4,512} x_j \quad (21)$$

where $f_{ij}$ is the filtered EEG data derived from the $i^{th}$ filter acting upon the $j^{th}$ EEG channel. The Nyquist-domain processing matrix for each BPF can thus be defined as $H_i = H^*_i D_{4,512}$. This matrix is rectangular and has a dimensionality of 128×512. As shown in FIG. 14, spectral-energy feature extraction in NA can be represented as a product of the decimation matrix $D_{4,512}$ and an FIR band-pass filter $H^*$.

In CA, compressed-domain processing matrices $\hat{H}_i$ is derived from the corresponding rectangular NA matrices $H_i$ using the solution above. Note that $\hat{H}_i$ has K×M [or N(1/v+1/$\xi$)] entries. As in NA, the processed signal from each filter as: $\hat{f}_{ij} = \hat{H}_i \Phi x_j$ is then obtained where the processing matrix $\hat{H}_i$ acts directly on the compressively-sensed signal $\Phi x_j$. A CA-estimate of the spectral energy is then derived as: $\hat{y}_{ij} = \hat{f}_{ij}^T \hat{f}_{ij}$.

Figure 15:
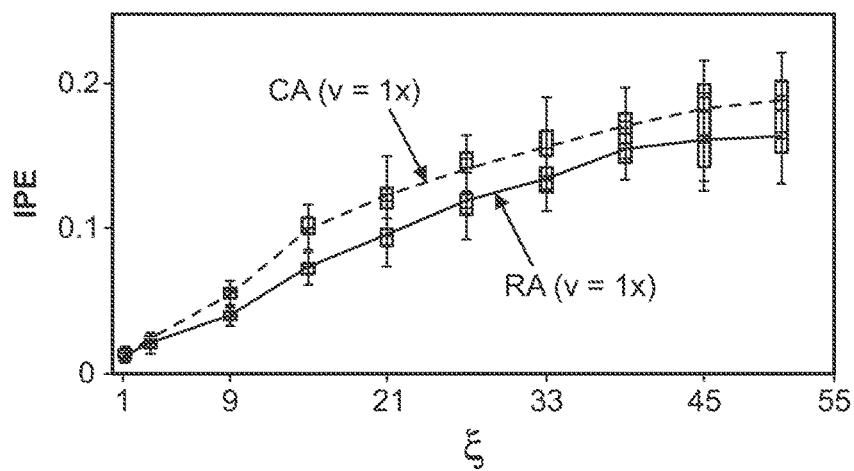
FIG. 15 shows the trend in the IPE for RA and CA, as computed across ten different pairs of Θ (random matrix) and Φ (projection matrix), according to an exemplary embodiment.

The error in the FVs (IPE) is defined as: IPE = $\|\hat{y}_{ij} - y_{ij}\| / y_{ij}$. It is expected that the error will increase with increasing compression ($\xi > 1\times$). For these experiments, $v = 1\times$ was kept and $\xi$ was scaled. The computational savings in CA thus increase with $\xi$ [$\hat{H}$ has N(1/v+1/$\xi$) entries]. FIG. 15 shows the trend in the IPE. The plot also shows the variation in the IPE across all patients in the database. It was observed that the IPE was less than 19.5% up to $\xi = 51\times$, at which point only 10 EEG samples per epoch were transmitted and processed. The figure also shows the IPE in RA, where each epoch was reconstructed using gradient projection. For each patient, a new sparse dictionary $\Psi$ was learned from K-SVD using 10-fold cross-validation. It was observed that IPE in CA is close to the IPE in RA, thus validating the solution for $\hat{H}_i$ above. The variation in the mean IPE values shown in FIG. 15 corresponds to the 21 patients in the CHB-MIT database. Mean IPE was computed across ten different pairs of $\Theta$ and $\Phi$. Mean IPE in CA is close to the mean IPE in RA.

Figure 16:
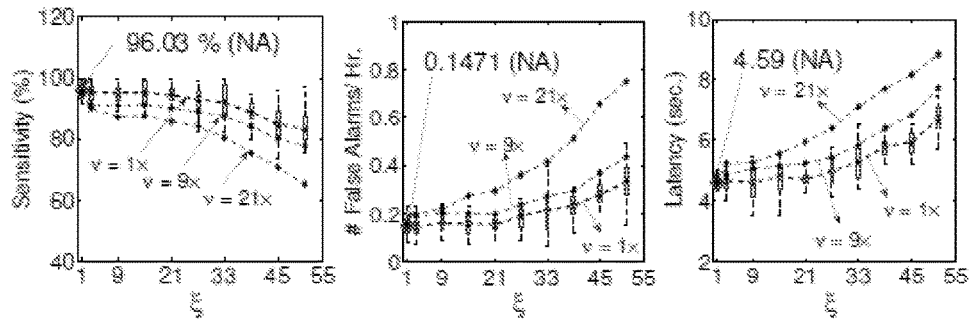
FIG. 16 shows the scaling in mean and standard deviation of the performance metrics in CA computed across 10 different pairs of Φ and Θ, according to an exemplary embodiment.

To evaluate the performance of the compressed-domain detector, FVs were derived from the CHB-MIT database. These FVs were used to train and test the SVM classifier in a patient-specific manner. A leave-one-out cross-validation scheme was employed for measuring the performance of the detector. FIG. 16 and Table II show the scaling in mean and standard deviation of the performance metrics in CA computed across 10 different pairs of Φ and Θ. Mean performance of the seizure-detection algorithm in CA is computed across ten different pairs of Θ and Φ. The variation in the mean performance values shown in the figure corresponds to the 21 patients in the CHB-MIT database. Performance is maintained up to ξ=21×. The performance of the compressed-domain detector is very close to the Nyquist case at ξ=1×. For CA, at a compression of 1×, the sensitivity is 95.53%, latency is 4.59 sec., and the number of false alarms is 0.1538/hr. These performance numbers begin to degrade with both ξ and ν. The corresponding numbers at ξ=21× are 94.43%, 4.70 sec., and 0.1543/hr., respectively. As described above, ν=1× gives the lowest approximation error to the JL lemma. Thus, the performance is highest at ν=1× and begins to degrade at higher values of ν. At higher values of (which also give corresponding energy savings), the degradation in sensitivity is modest. For instance, at ν=1×, the degradation is 1.1% when ξ=21×, beyond which it begins to drop more significantly. The scaling in the number of false alarms per hour and the latency also follows a similar trend. The mean latency of detection increases by 2.41% while the specificity of the algorithm degrades by only 0.33% at ξ=21×.

Figure 17:
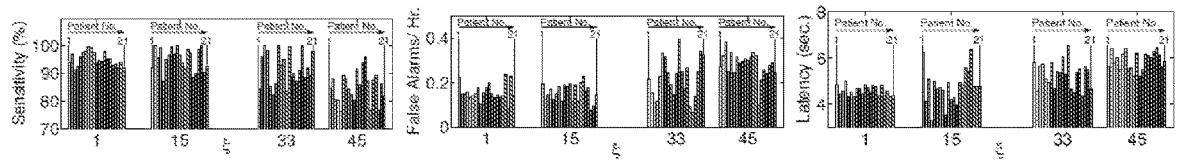
FIG. 17 shows the variation in the performance of seizure detector across different patients at v=1×, according to an exemplary embodiment.

FIG. 17 shows the variation in the performance at ν=1× for one pair of Φ and Θ. It is observed that the stochastic nature of the JL lemma leads to non-uniform errors in the performance metrics. Variation in the performance of seizure detector across different patients at ν=1× is shown. The stochastic nature of the JL lemma results in non-uniform error values.

Figure 18:
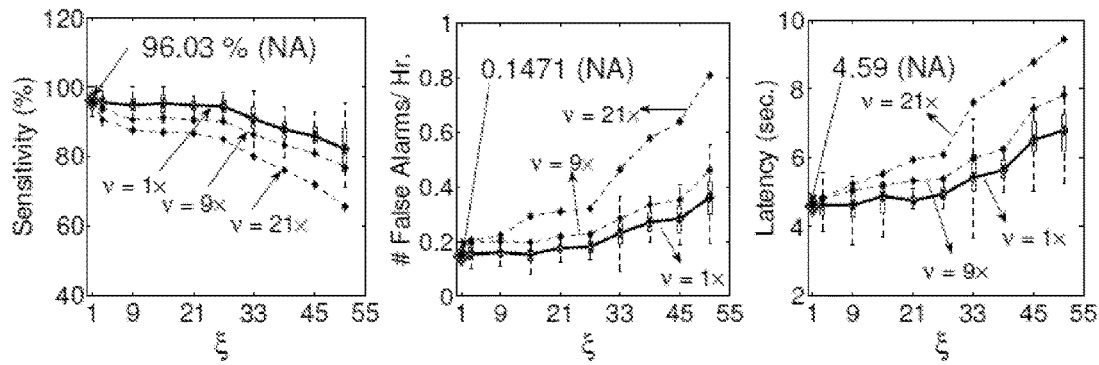
FIG. 18 shows mean performance in RA computed across ten different pairs of Θ and Φ, according to an exemplary embodiment.

FIG. 18 shows the performance in RA. It shows mean performance in RA computed across ten different pairs of Φ and Θ is close to the performance in CA. The variation in the mean performance values shown in the figure corresponds to the 21 patients in the CHB-MIT database. These trends, however, do not correlate with the IPE in FIG. 15. For example, at ξ>39×, IPE in RA is almost constant around 16% but the difference in performance for values of ξ>33× is significant.

The information content in the FVs, which has been shown to be a metric that directly indicates the end-to-end performance of the detector, is described below.

Figure 19:
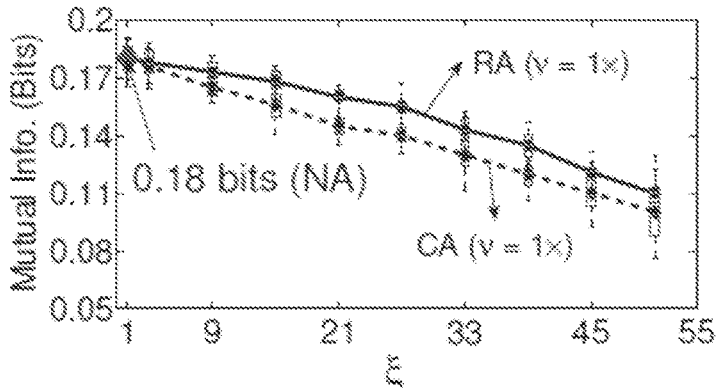
FIG. 19 shows the variation in mutual information of the FVs in RA and CA vs. ξ, according to an exemplary embodiment.

Mutual information between the FVs and the class labels acts as an indicator for the performance of a classifier. High mutual information results in better performance. FIG. 19 shows the variation in mutual information of the FVs in RA and CA vs. ξ. FIG. 19 shows mean mutual information across ten different pairs of Φ and Θ. The variation in the mean information values shown in the figure corresponds to the 23 patients in the CHB-MIT database. Mean mutual information in CA and RA follows the performance trends. As can be seen, the inference performance is high until mutual information falls below a specific level. This value is specific to the application data and the classifier used. For example, from FIGS. 16, 18, and 19, it can be observed that the performance degrades only minimally up to ξ=21×, which corresponds to a mutual information value of about 0.15 bits. Hence, based on the mutual information results for the multi-rate system described herein, very limited degradation is seen up to large compression factors. Thus, this limited degradation in information supports the CA system model.

Hardware Analysis:

The hardware complexity of CA is compared below with that of NA. The number of computations required in CA can be substantially lower. However, there is an increased cost in storage that is required to accommodate the extra coefficients in $\hat{H}$.

Figure 20A:
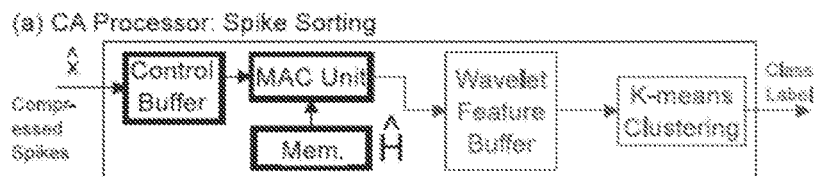
FIG. 20A shows an architectural block diagram of a CA processor for spike sorting, according to an exemplary embodiment.
Figure 20B:
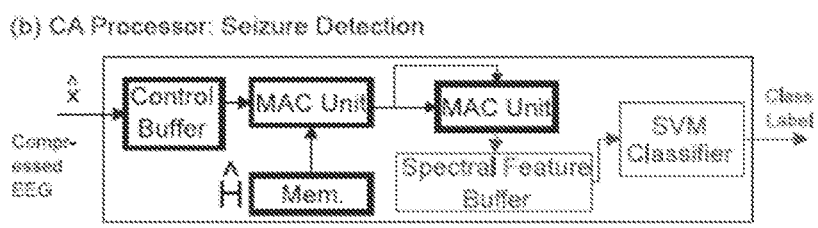
FIG. 20B shows an architectural block diagram of a CA processor for seizure detection, according to an exemplary embodiment.

FIGS. 20A and 20B show architectural block diagrams of CA processors for spike sorting and seizure detection, respectively. In these processors, different values of ξ and ν impact only the multiply-accumulate (MAC) units and the memory where the $\hat{H}$ coefficients reside. As described above, four levels of decomposition with a (order-2) Haar wavelet and eight 64-order BPFs are required for the two applications, respectively.

Figures 21A, 21B, 21C, 21D:
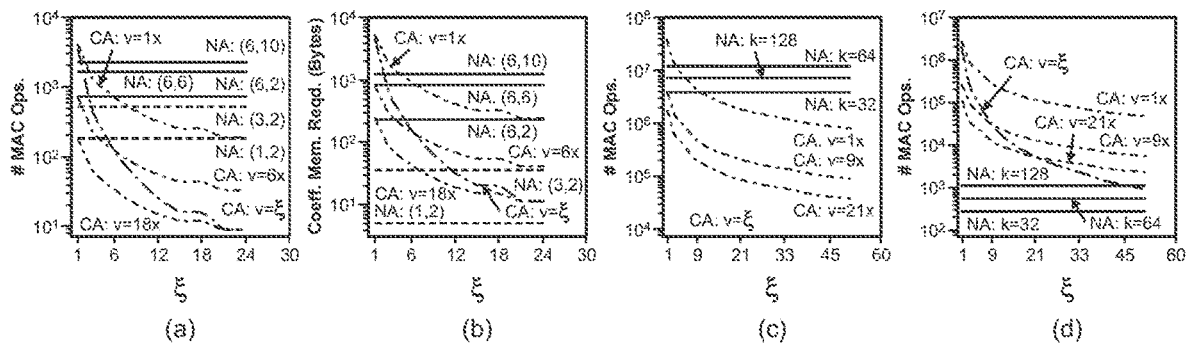
FIG. 21A shows the scaling in the estimated number of MAC operations for the spike sorting application, according to an exemplary embodiment.
FIG. 21B shows the scaling in the memory required for the spike sorting application, according to an exemplary embodiment.
FIG. 21C shows the estimated MAC operations for the seizure-detection application, according to an exemplary embodiment.
FIG. 21D shows the estimated the memory requirement for the seizure-detection application, according to an exemplary embodiment.

FIGS. 21A and 21B show the scaling in the estimated number of MAC operations and the memory required, respectively, for the spike sorting application. CA incurs fewer computations than NA at the cost of increased storage. The estimates for NA are given using different pairs of wavelet order and decomposition level. As can be observed, the number of MAC operations required by the exact solution (Ξ=ν) is below that of NA for ξ>5×. This is true for wavelets of all orders and for all decomposition levels. However, the memory required in CA is higher than that required by low-order wavelets. For example, for two levels of decomposition using an order-3 wavelet, ξ is greater than 11× for the exact solution. This increase in memory can be addressed by using a higher value of ν, which results in smaller $\hat{H}$ matrices; there is thus a tradeoff between memory size and accuracy. FIGS. 21C and 21D show the estimated MAC operations and the memory requirement for the sei-

TABLE II

Standard deviation across ten different pairs of Φ and Θ in the mean inference performance (mean computed across the 21 patients) of the seizure detector in CA and RA.

| | Sensitivity (%) | | | | | | | | | | False Alarms/Hr. | | | | |
|---|---|---|---|---|---|---|---|---|---|---|---|---|---|---|---|
| e= | 1× | 3× | 9× | 15× | 21× | 27× | 33× | 39× | 45× | 51× | 1× | 3× | 9× | 15× | 21× |
| CA | 0.43 | 0.57 | 1.22 | 1.84 | 2.77 | 2.36 | 3.36 | 3.24 | 3.99 | 4.79 | 0.01 | 0.01 | 0.03 | 0.03 | 0.05 |
| RA | 0.88 | 1.10 | 1.65 | 2.14 | 2.25 | 2.96 | 3.45 | 3.54 | 3.50 | 4.44 | 0.00 | 0.02 | 0.02 | 0.02 | 0.06 |

| | False Alarms/Hr. | | | | | Latency (seconds) | | | | | | | | | |
|---|---|---|---|---|---|---|---|---|---|---|---|---|---|---|---|
| e= | 27× | 33× | 39× | 45× | 51× | 1× | 3× | 9× | 15× | 21× | 27× | 33× | 39× | 45× | 51× |
| CA | 0.05 | 0.06 | 0.07 | 0.08 | 0.11 | 0.10 | 0.11 | 0.19 | 0.52 | 0.54 | 0.73 | 1.09 | 1.27 | 1.42 | 1.47 |
| RA | 0.06 | 0.09 | 0.11 | 0.11 | 0.15 | 0.09 | 0.23 | 0.35 | 0.69 | 0.76 | 1.22 | 1.17 | 1.50 | 1.43 | 1.79 | zure-detection application, respectively. A similar computation-memory trade-off can be observed. In this case, since multiple data channels are processed, substantial scaling in v (>>21×) is required to match the memory of NA. However, as shown above, such a high scaling leads to a very sub-optimal detector performance.

As can be seen from the foregoing, although CA provides substantial savings in computation and communication energies, it potentially requires more data storage than NA. Consequently, architectures and technologies that address the memory energy and footprint can play an important role in the use of CA.

Sparsity of signals provides an opportunity to efficiently represent sensor data. Compressive sensing is one technique that exploits signal sparsity in a secondary basis to achieve very low-energy compression at the cost of high complexity in signal reconstruction. The energy for reconstruction can present a significant barrier to signal analysis, which is becoming increasingly important in emerging sensor applications. The approach described above not only circumvents the energy imposed by signal reconstruction, but also enables computational energy savings by processing fewer signal samples. Through analytical validations, this approach was shown to achieve error bounds in feature estimates that are very close to the expected lower limit. This approach was validated with the two case studies describe above, namely spike sorting for neural prosthesis and EEG classification for seizure detection. For the neural-prosthesis application, the experimental results suggest that up to 54× fewer samples can be processed while restricting detection errors to under 3.5%. Using this approach, the reduction in the communication energy can also be significant. For instance, in the seizure-detection application, the detection error was under 2.41% when ~21× fewer transmitted EEG samples were used. The proposed approach thus provides an approach for signal-processing systems that address system-resource constraints, such as energy and communication bandwidth, through efficient signal representation.

In another exemplary embodiment, a prototype IC is used to enable the two resulting power-management knobs within an energy-scalable EEG-based seizure-detector. The resulting algorithm for compressed-domain analysis increases the number of signal-transformation coefficients that need to be stored compared with a traditional Nyquist-domain algorithm. A key attribute of the IC is thus a scalable SRAM. The algorithm and detailed analysis and measurements from the IC implementation are described below. This implementation can take advantage of encryption and security to ensure that the sensitive patient information is maintained in a safe and secure manner. The additional energy savings provided by such encryption and security based systems and methods is unexpected because of the few bits output by the classifier, and allows encryption and security features and functionality to be provided at the sensor node.

Figure 22:
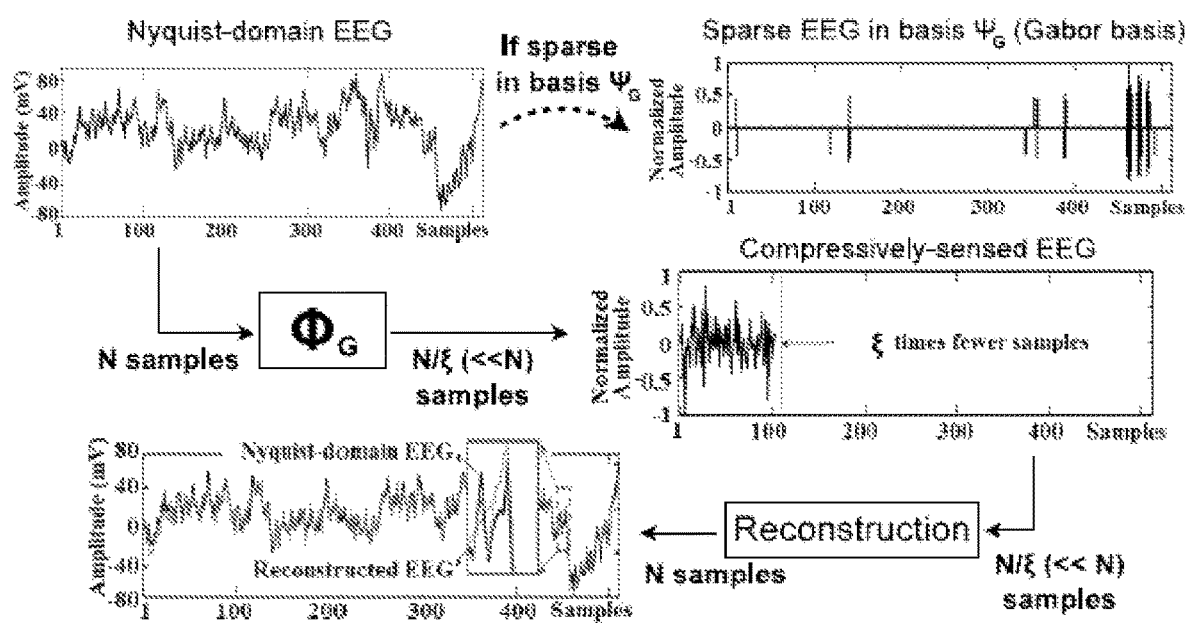
FIG. 22 shows the concept of compressed-domain detection, according to an exemplary embodiment.

FIG. 22 illustrates the concept of compressed-domain detection. EEG is known to be sparse in the Gabor basis $\Psi_G$. This enables low-energy compression using a random projection matrix $\Phi_G$. The resulting EEG-signal representation is compressed, but also substantially altered. Nonetheless, a corresponding representation of the desired signal features can be obtained by transforming the feature-extraction computations based on $\Phi_G$. This results in a compressed-domain seizure detector. The resulting transformation not only overcomes the need for signal reconstruction, but also leads to computational energy savings due to a reduction in the number of input samples that need to be processed. Although accurate reconstruction is possible, it is computationally intensive, motivating signal analysis directly using the compressed signal. The IC thus provides an approach for reducing the computational energy of signal analysis within the processor.

Signal-classification algorithms typically base their decision rules on key features extracted from the signals via signal-processing functions; this is particularly true for medical detectors, where the features often correspond to physiological biomarkers. These algorithms then use a classifier to perform modeling and inference over the extracted features. Powerful classification frameworks exist in the domain of machine learning that can construct high-order and flexible models through data-driven training. In many such frameworks, the classification step utilizes a distance metric, such as, for example, 2-norm or inner product, between feature vectors (FVs). In certain cases, the distance metric may also be invoked within the feature extraction step, for instance, to extract spectral energies, which form generic biomarkers for neural field potentials, such as for example, brain-machine interfaces, and sleep disorders, among other things. The following description relates to a seizure-detection application, where clinical studies have shown that EEG spectral energy, derived using the inner product between FVs after linear finite impulse response (FIR) filtering, can serve as a biomarker that indicates the onset of a seizure.

Figure 23:
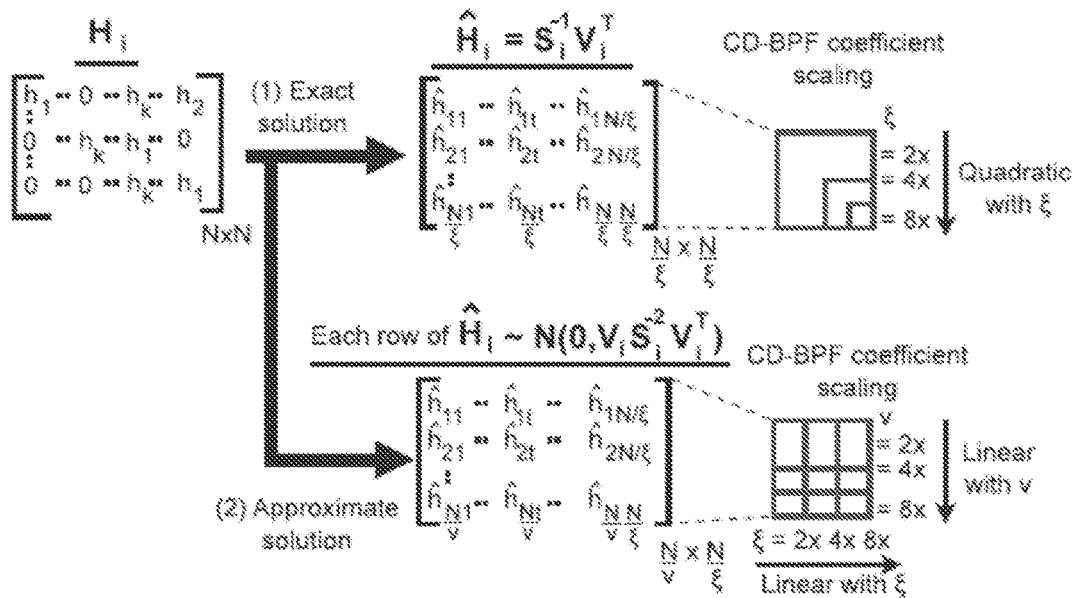
FIG. 23 shows CD-BPF matrices $\hat{H}_i$, derived using $H_i$ and Φ, according to an exemplary embodiment.

The scalability of $\xi$ and v can be exploited as knobs for system power management. An important consequence of the algorithmic construction proposed is that the CD-BPF matrices $\hat{H}_i$ (which are of dimensionality $$\frac{N}{\xi} \times \frac{N}{\xi}$$

for the exact solution and $$\frac{N}{v} \times \frac{N}{\xi}$$

for the approximate solution) do not retain the regularity of $H_i$. CD-BPF matrices $\hat{H}_i$, derived using $H_i$ and $\Phi$, disrupt the regularity and zeros in $H_i$. The complexity of the CD-BPFs thus scales (a) quadratically with $\xi$ for the exact solution and (b) linearly with $\xi$ and v for the approximate solution. Even though $H_i$ are of dimensionality N×N, as shown in FIG. 23, the rows of $H_i$ are simply selected to implement convolution, and thus are shifted versions of the impulse response of the same FIR filter. As a result, very few unique filter coefficients are required, and many of the coefficients are zero, as determined by the FIR-filter order k. However, in deriving $\hat{H}_i$, the shifted impulse responses and zero entries are disrupted. As shown in FIG. 23, the number of multiplications required thus no longer depends on the filter order, but rather (1) quadratically on the compression factor $\xi$ for the exact solution and (2) linearly on both $\xi$ and v for the approximate solution. This scaling can potentially reduce the number of multiplications required.

Figure 24:
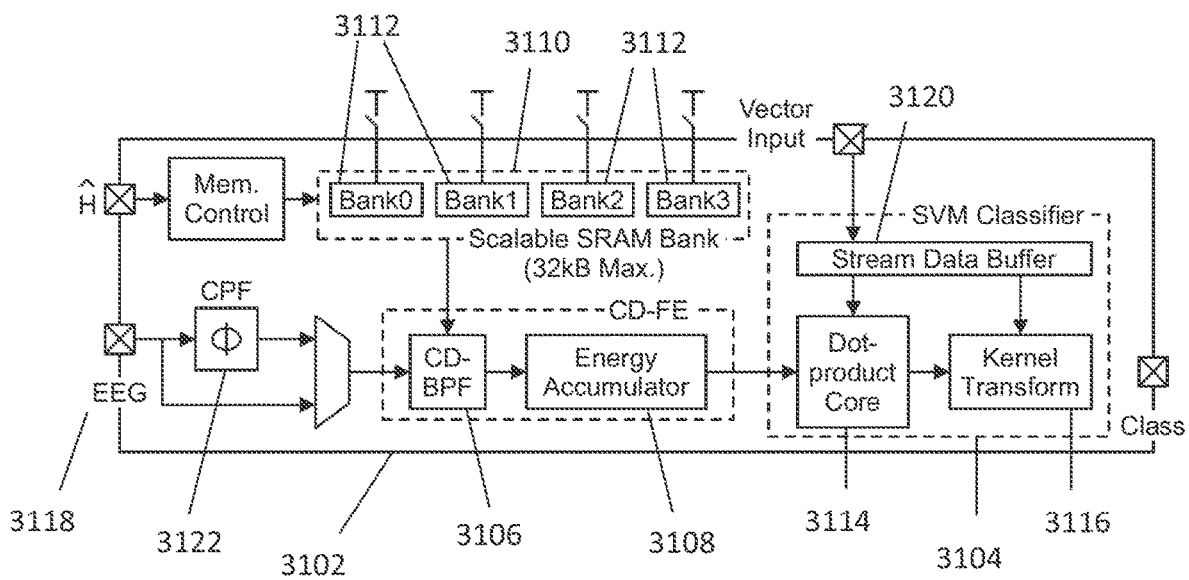
FIG. 24 shows an architecture block diagram of energy-scalable, compressed-domain seizure detector, according to an exemplary embodiment.

To exploit this attribute, an energy-scalable processor architecture for a compressed-domain seizure detector can be used, whose block diagram is shown in FIG. 24. The processor consists of two computational stages: a compressed-domain feature extraction stage 3102 followed by a SVM classification stage 3104. The compressed-domain feature extractor (CD-FE) includes a CD-BPF 3106 and energy-accumulator block 3108. The coefficients for the CD-BPF are pulled from a scalable SRAM bank 3110. Due to the disruption in regularity, the $\hat{H}_i$ matrices need a larger number of distinct coefficients to be stored, potentially increasing the memory requirements. Scalability in the SRAM bank 3110 is thus an important aspect of power management. This can be achieved through the use of multiple subarrays 3112, which enable fine-grained power-gating as well as reduced bit-line and word-line access energy. The total bank size in this implementation is 32 kB, which is partitioned into four subarrays 3112. The SVM classification stage, which comprises an inner-product core 3114 followed by a kernel transform 3116, and uses a stream data buffer 3120, is also integrated to perform real-time seizure detection using the derived FVs. Compressively-sensed EEG signals 3118 are input directly to the processor for seizure detection. However, for the case of Nyquist inputs, a compressive-projection frontend (CPF) 3122 is also included to explicitly multiply inputs by a random projection matrix Φ. Thus, the energy savings derived from a reduced number of samples can be exploited even if the original input signal is not compressively sensed.

Figure 25:
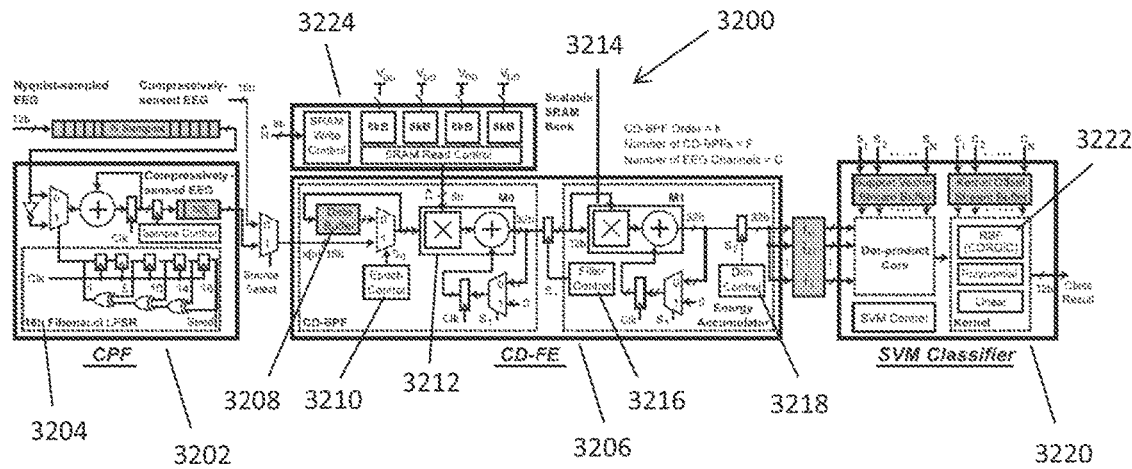
FIG. 25 shows the circuits used in an exemplary embodiment of a compressed-domain processor, according to the present disclosure.

FIG. 25 shows the circuits used in the compressed-domain processor 3200. The CPF 3202 is selectable for front-end signal compression. It uses a 16-bit linear feedback shift register (LFSR) 3204 to implement multiplication with a random projection matrix Φ, as shown. Since the processor operates on an EEG epoch of 2 seconds, FVs are derived at the rate of 0.5 Hz. At this low rate, the CD-FE 3206 can compute each feature dimension sequentially and store the intermediate results in a data buffer 3208. The CD-FE 3206 can be configured to compute up to eight spectral features (i=0, . . . , 7) for each EEG channel (j) over as many as 18 channels, yielding a maximum FV dimensionality of 144. Within the CD-FE 3206, the control pulse $S_0$ provided by the epoch control 3210 initiates CDBPF computations. A multiply-accumulate (MAC) unit (M0) 3212 is used to perform the matrix multiplications required for compressed-domain band-pass filtering using $\hat{H}_i$. Each filtered EEG epoch is then registered by the control pulse $S_1$, and passes to a second MAC unit (M1) 3214 via a filter control 3216. Energy accumulation over the output vector is then performed by a second MAC unit (M1) 3214. After the feature-extraction process, which, in some embodiments, requires (N/ξ)(N/ξ+1) MAC operations, each FV dimension ($\hat{f}_{ij}$) is stored in an intermediate FV buffer based on the control pulse $S_2$, from dim control 3218.

Figure 26A:
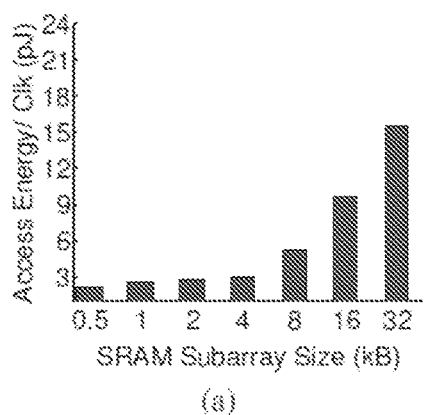
FIG. 26A shows SRAM access energy, according to an exemplary embodiment.

In one embodiment, filter coefficients are represented using 8 bits of precision. Thus, to support CD-FE computations, the processor requires a maximum of 32 kB accesses per second from the memory bank. FIG. 26A shows that the SRAM energy per access ($E_{acc}^{sram}$) is reduced by choosing smaller-sized subarrays. Since the ξ and v knobs scale the memory required, designing a single 32 kB array would be sub-optimal for many of the parameter points. Instead, four subarrays (each of size 8 kB) were designed to balance savings in energy per access with the overhead of further partitioning. With subarray partitioning, leakage-energy saving can be achieved by independently power-gating each sub-array (from off-chip).

As shown in FIG. 25, after the CD-FE computations, each FV is processed by the SVM Classifier block 3220 within the epoch duration of two seconds. The SVM 3220 can apply linear, polynomial, or radial-basis function (RBF) kernel transformations, via an embedded CORDIC engine 3222. The support vectors are derived from offline training of the classifier and are provided through a dedicated interface. The classification result is encoded in the most significant bit (MSB) of the SVM output (MSB=1 for seizure detected, MSB=0 for no seizure detected).

The CD-FE energy comprises the logic and SRAM energy subcomponents. The SRAM 3224 consumes a substantial portion of the total CD-FE energy. Its optimization to exploit scalability with respect to ξ and v is thus a key factor. The detector processes an EEG epoch every $T_{EPOCH}$=2 sec. However, the optimal operating frequency (and supply voltage $V_{dd,opt}$) for the CD-FE logic is determined by minimizing the overall CDFE energy, while ensuring a minimum throughput that allows the active CD-FE computations to be completed in $T_{CD-FE}$ (<2) seconds for each value of ξ and v. For the remainder of the epoch (i.e., $T_{EPOCH}-T_{CD-FE}$), the logic and SRAMs 3224 can be placed in low-energy idle modes.

Figure 26B:
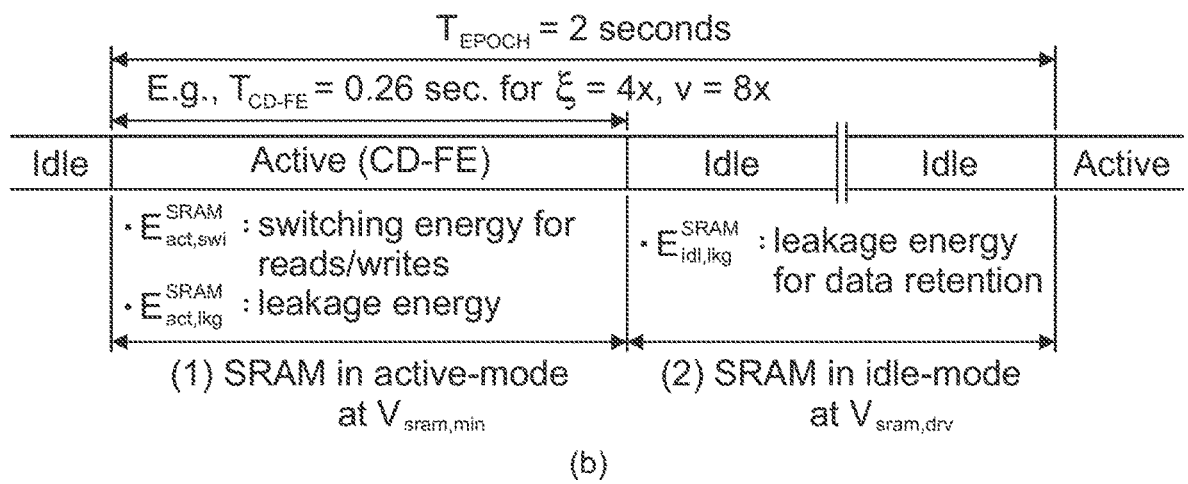
FIG. 26B shows a summary of energy components contributing to total SRAM energy, according to an exemplary embodiment.

FIG. 26B summarizes the SRAM 3224 operating modes and energies and is a summary of energy components contributing to total SRAM energy (the ξ=4×, v=8× case is shown for illustration). The total SRAM energy is the sum of the active-mode ($E_{act}^{SRAM}$) and idle-mode ($E_{idl}^{SRAM}$) energies for each subarray (numbering $N_{sub}$) that is enabled; under the assumption that the SRAMs 3224 cannot by fully power-gated in order to ensure data retention, $E_{idl}^{SRAM}$ is not zero. During the active mode, the SRAM 3224 operates at the minimum operational supply voltage ($V_{sram,min}$) of 0.7 V for reads and writes; at this voltage, it operates at 920 kHz; this is sufficient performance for all design points (ξ, v) of the CD-FE, thus allowing the SRAM voltage to remain at 0.7 V. During the idle mode, the SRAM 3224 operates at its minimum data-retention voltage ($V_{sram,drv}$) of 0.42 V.

In the active mode, while set to a supply voltage of $V_{sram,min}$, $E_{act}^{SRAM}$ comprises active-switching ($E_{act,swi}^{SRAM}$) and leakage ($E_{act,lkg}^{SRAM}$) energies for a period of $T_{CD-FE}$. In the idle mode, while set to a supply voltage of $V_{sram,drv}$, $E_{idl}^{SRAM}$ comprises only the leakage energy ($E_{idl,lik}^{SRAM}$) for the duration ($T_{EPOCH}-T_{CD-FE}$). Thus, the SRAM energy components can be represented as follows:

$$E_{lkg}^{SRAM} = E_{act,lkg}^{SRAM} + E_{act,lkg}^{SRAM} \qquad (22)$$
$$= N_{sub}T_{CD-FE}\{I_{V_{sram,min}} V_{sram,min}\} +$$
$$N_{sub}(T_{EPOCH} - T_{CD-FE})\{I_{V_{sram,drv}} V_{sram,drv}\}$$

$$E_{act,swi}^{SRAM} = E_{acc}^{sram} \times \text{\# accesses} \qquad (23)$$

The duration of the active mode ($T_{CD-FE}$) in Eq. (22) depends on ξ, v, and the optimum logic voltage $V_{dd,opt}$. For smaller values of ξ and v, there are more coefficients in $\hat{H}_i$ and $T_{CD-FE}$ (the active CD-FE time) is higher, and for larger values of ξ and v, there are fewer coefficients in $\hat{H}_i$ and $T_{CD-FE}$ (the active CD-FE time) is lower. For instance, $T_{CD-FE}$ is 0.26 sec. for ξ=4× and v=8×, as shown in FIG. 26B. It increases to 0.52 sec. at ξ=v=4× and reduces to 0.13 sec. at ξ=4× and v=16×.

Figure 27:
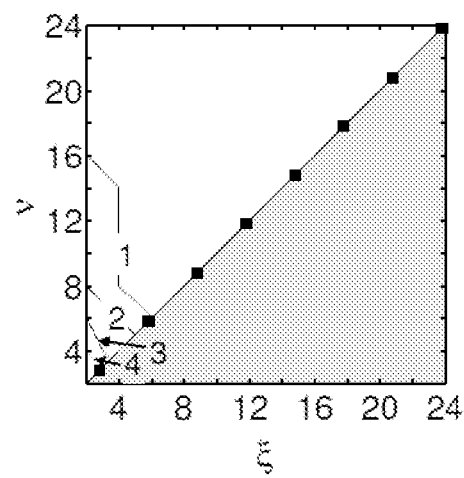
FIG. 27 shows dependence between the number of active subarrays ($N_{sub}$) as a function of ξ and v, according to an exemplary embodiment.

Further, the number of active subarrays ($N_{sub}$) is also a function of ξ and v; FIG. 27 shows this dependence. $N_{sub}$ scales substantially with ξ and v, affecting the SRAM leakage energy. Eqs. (22) and (23) also show that although $E_{act,swi}^{SRAM}$ remains invariant to changing values of $V_{dd}$, it is impacted by ξ and v (since the number of accesses changes with ξ and v). Note that in Eq. (23), $E_{acc}^{SRAM}$ denotes the active-switching energy per access, which remains invariant to changing values of $V_{dd}$, ξ, and v. Similar to $E_{act,swi}^{SRAM}$ the SRAM leakage energy $E_{lkg}^{SRAM}$ also scales substantially with ξ and ν. Consequently, the optimal logic voltage $V_{dd,opt}$, which minimizes the SRAM 3224 and logic CD-FE 3206 energy, changes with respect to ξ and ν.

Figure 28:
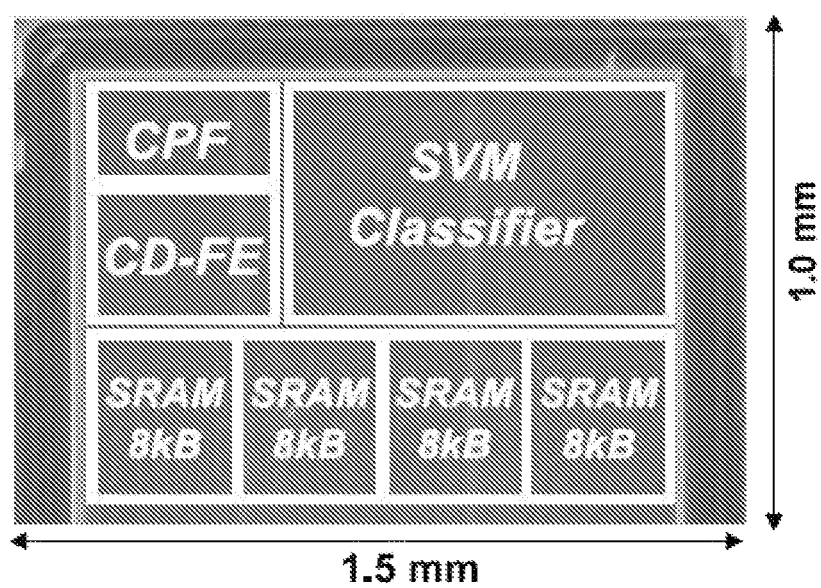
FIG. 28 is a die photo of the integrated circuit (IC) forming the circuits used in the compressed-domain processor of FIG. 25, according to an exemplary embodiment.

The IC was prototyped in a 0.13 μm CMOS process from IBM. The die photograph of the integrated circuit forming the circuits of the compressed-domain processor of FIG. 25 and performance summary are shown in FIG. 28 and Table III, respectively. 18 channels of Nyquist EEG signals are sampled at a rate of 256 Hz, and eight CD-BPFs are derived corresponding to eight Nyquist domain BPFs, each of order k=64 (based on the filter specifications required for seizure detection). This leads to a total FV dimensionality of 144. Table III shows that the CPF permits EEG compression by a factor of ξ=2-24×, consuming 85-7.3 pJ of energy. In the CPF, a 16-bit LFSR generates a sequence of ±1 values. Based on these values, each compressively-sensed signal sample is computed serially as $\hat{x}_i = x_1 \pm x_2 \pm \ldots \pm x_N$. This process is repeated N times to provide the compressively-sensed signal $\hat{x}$.

dence on ξ and ν. Primarily, the SRAM leakage energy in the active ($E_{act,lkg}^{SRAM}$) and idle mode ($E_{idl,lkg}^{SRAM}$) is substantially impacted by $N_{sub}$ and $T_{CD-FE}$. The active-mode SRAM switching energy ($E_{act,swi}^{SRAM}$) changes with ξ and ν, but not with Vdd. For all values of $N_{sub}$, the active energy ($E_{swi}^{logic}$) of the CD-FE logic increases and the leakage energy ($E_{lkg}^{logic}$) decreases with increasing values of $V_{dd}$, leading to the minimum-energy point of 0.46 V. However, this is not $V_{dd,opt}$ since the SRAM energy also needs to be considered. The SRAM operates at 0.7 V in the active mode. It can be seen from FIG. 30 that the SRAM active-mode switching energy $E_{act,swi}^{SRAM}$ does not change with $V_{dd}$ (consistent with Eq. (23)). Further, the leakage energies in the active ($E_{act,lkg}^{SRAM}$) and idle modes ($E_{idl,lkg}^{SRAM}$) increase as $N_{sub}$ increases. This is also expected since from Eq. (22), $E_{lkg}^{SRAM}$ depends on $N_{sub}$. However, since both $E_{act,lkg}^{SRAM}$ and $E_{idl,lkg}^{SRAM}$ also depend on $V_{dd,opt}$, the increase in the leakage energies is not proportional to the increase in $N_{sub}$ (Eq. (22)). The total CDFE energy is thus a non-linear function of ξ and ν, which necessitates $V_{dd,opt}$ to be determined numerically.

TABLE III

Performance summary: energy-scalable, compressed-domain processor IC

| Technology | IBM 130 nm LPCMOS | | SUBBLOCK ENERGY MEASUREMENTS | |
|---|---|---|---|---|
| | | | per FV | per Clock |
| Supply voltage | CD-FE: 1.2-0.44 V | CPF (at 0.48 V) | 85.0-7.3 pJ | 10.6 fJ |
| | SRAM: 0.7/0.42 V | CD-FE logic (at $V_{dd,\,opt}$) | 70.8-1.3 nJ | 1.3 pJ |
| | CPF/SVM: 0.48 V | SRAM sub array (at 0.7 V) | 2.1-0.1 μJ | 5.0 pJ |
| EEG sampling rate | 256 Hz | | | |
| Clock frequency | 10.2-0.3 MHz | Total Feature Extraction | 2.1 μJ-93.2 nJ | 6.3 pJ |
| CPF compression factor ξ | 2-24× | SVM    RBF | 16.0-53.2 μJ | 6.0 pJ |
| Projection factor ν | 2-24× |            Poly4 | 10.5-38.4 μJ | 4.8 pJ |
| Feature computation rate | 0.5 Hz |            Linear | 62.9-209.0 nJ | 2.0 pJ |
| CD-BPF memory size | 0.44-32 kB | Total Processor (linear SVM) | 2.2-0.3 μJ | 8.3 pJ |

The total processor energy is in the range 0.3-2.2 μJ (for linear SVMs), 12.6-38.5 μJ (for non-linear SVMs using a fourth-order polynomial kernel (poly4)), and 18.1-53.3 μJ (for SVMs with an RBF kernel). Since classification results are produced every two seconds (i.e., FVs are processed at a rate of 0.5 Hz), the total processor power lies in the range 0.15-27 μW for all SVM kernels.

FIG. 29 shows a scatter plot of the first two principal components of the measured FVs from the IC. Distribution of FVs derived from the IC using data from Patient #01 in the CHB-MIT database. Although full feature data dimensionality is used for classification, projection to two dimensions via PCA is shown to aid visualization. Results are shown for (a) Nyquist-domain processing, (b) exact solution at ξ=9×, and (c) exact solution at ξ=21×. The FVs are derived using all data records for patient #1 in the CHB-MIT dataset. It can be observed from the figure that there is a good separation between the seizure and non-seizure FVs in the compressed domain even at ξ=21×. The results presented next consider the impact of ξ and ν scaling on the feature-extractor, classifier, and overall processor energies.

As described above, the SRAM leakage energy changes with both ξ and ν. Thus, the optimal voltage ($V_{dd,opt}$) for the CD-FE logic changes with both ξ and ν. In order to determine $V_{dd,opt}$, the total CD-FE energy comprising the logic and SRAM energies is minimized.

Figure 31:
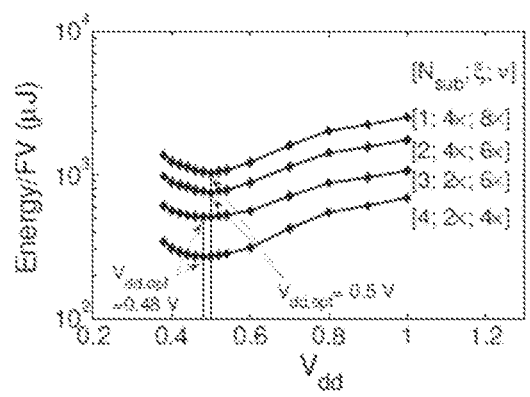
FIG. 31 shows the measured CD-FE energy at different voltage values for the cases considered in FIG. 30.

FIG. 30 shows the measured subcomponents of the CD-FE energy with respect to $V_{dd}$ when $N_{sub}$ ranges from 1 to 4 (corresponding to four different values of ξ and ν). The CD-FE energy subcomponents introduce non-linear depen- FIG. 31 shows the measured CD-FE energy at different voltage values for the cases considered in FIG. 30. For these four instances, it can be seen from the figure that the optimal voltage ($V_{dd,opt}$) for the CD-FE logic is either 0.48 V or 0.5 V.

Figure 32:
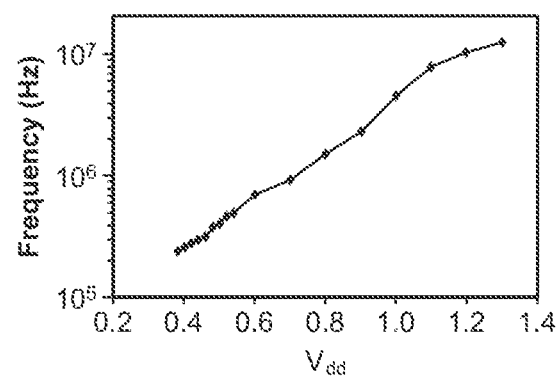
FIG. 32 shows the operating frequency vs. $V_{dd}$ for the CD-FE logic of the processor shown in FIG. 25.
Figure 33A:
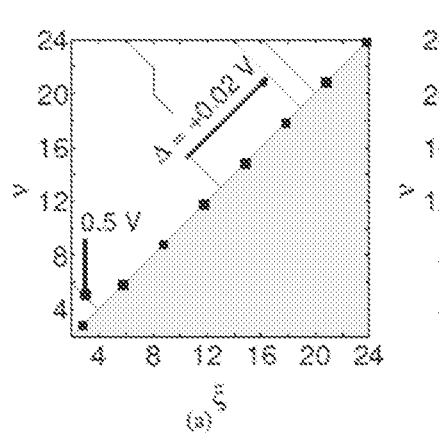
FIG. 33A shows the optimal voltage for the CD-FE logic ($V_{dd,opt}$) as ξ and v scale in the 2-24× range, according to an exemplary embodiment.
Figure 33B:
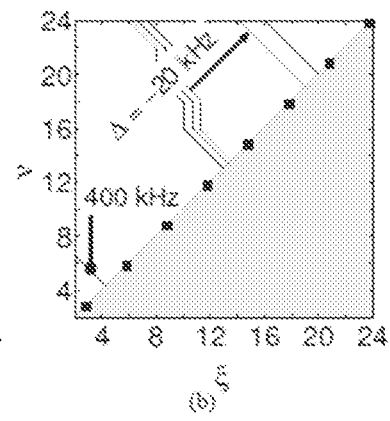
FIG. 33B shows the corresponding operating frequency for the CD-FE logic ($V_{dd,opt}$) as ξ and v scale in the 2-24× range, according to an exemplary embodiment.
Figure 33C:
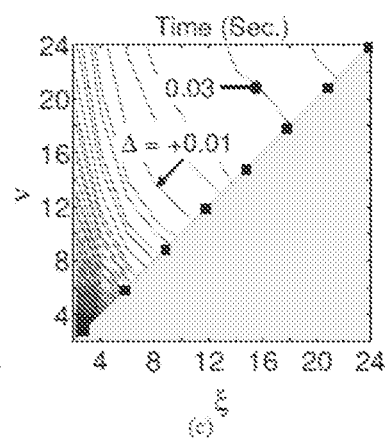
FIG. 33C shows the CD-FE active time ($T_{CD-FE}$) for the CD-FE logic ($V_{dd,opt}$) as ξ and v scale in the 2-24× range, according to an exemplary embodiment.

FIG. 32 shows the operating frequency vs. $V_{dd}$ for the CD-FE logic. The corresponding frequencies are determined to be 380 kHz or 400 kHz, respectively, from the operating frequency vs. $V_{dd}$ plot for the CD-FE logic, as shown in FIG. 32. With more measurements, $V_{dd,opt}$, frequency, and active time ($T_{CD-FE}$) can be determined for the CD-FE logic when ξ and ν vary in the 2-24× range. As ξ and ν scale in the 2-24× range, (a) the optimal voltage for the CD-FE logic ($V_{dd,opt}$) varies in the 0.5-0.44 V range, (b) the corresponding operating frequency varies in the 400-300 kHz range, and (c) the CD-FE active time ($T_{CD-FE}$) varies in the 0.9-0.02 sec. range. The results are shown in FIGS. 33A, 33B, and 33C, respectively. For all values of ξ and ν, $T_{CD-FE}$ varies in the 0.9-0.02 sec. range and is below the epoch time of 2 sec., which allows sufficient time ($T_{EPOCH}-T_{CD-FE}$) for the SVM classifier to finish computing.

The CD-FE energy comprises the logic and SRAM energies. Below are provided measurement results for these energy subcomponents using both the exact and approximate solutions for $\hat{H}_i$.

When ξ=ν, the CD-FE complexity scales quadratically with ξ; for the approximate solution, it scales linearly with both ξ and ν. FIGS. 34A and 34B show the CD-FE energy for the exact and approximate solutions, respectively. For each value of ξ and ν, the energy is reported for $V_{dd,opt}$, which minimizes CD-FE's active-switching plus leakage energies as well as the SRAM energy; the $V_{dd,opt}$ values are also annotated in FIG. 34A.

FIGS. 35A and 35B show the SRAM leakage energies in the idle and active modes and FIG. 35C shows the SRAM switching energy in the active mode, versus ξ and v. Each of the SRAM energy subcomponents, i.e., (a) idle-mode leakage ($E_{idl,lkg}^{SRAM}$), (b) active-mode leakage ($E_{act,lkg}^{SRAM}$), and (c) active-mode switching ($E_{act,swi}^{SRAM}$) scales with both ξ and v. ($E_{act,lkg}^{SRAM}$) tends to dominate at smaller values of ξ and v. As can be seen from the figures, for smaller values of ξ and v, since the size of $\hat{H}_i$ is larger, $T_{CD-FE}$ is higher and the SRAM active energy dominates the idle-mode energy. This is also consistent with a higher value of $V_{dd,opt}$ at these values of ξ and v, which enables the CD-FE computations to finish sooner. In contrast, at larger values of ξ and v, however, there are fewer coefficients in $\hat{H}_i$ and the SRAM spends most of the time in the idle mode. This behavior is clear from FIGS. 36A and 36B, which show the total SRAM energy for the exact and approximate solutions. The total SRAM energy for (a) the exact solution and (b) the approximate solution scales substantially at smaller values of ξ and v. At higher values of ξ and v, CD-BPF matrices $\hat{H}_i$ are smaller, which makes $E_{idl,lkg}^{SRAM}$ dominate the total SRAM energy. FIGS. 36A and 36B show that the total SRAM energy is nearly equal to the $E_{idl}^{SRAM}$ mode energy at higher values of ξ and v. Further, FIGS. 36A and 36B also show substantial scaling in the total SRAM energy and in its constituents with respect to ξ and v. This scaling occurs due to the variation in $N_{sub}$ and $T_{CD-FE}$ due to ξ and v (see Eqs. (22) and (23) and FIGS. 27 and 33C). The SRAM energy thus eventually begins to saturate due to the granularity limit of the four subarrays; a finer granularity would enhance scaling at the cost of additional hardware overhead.

From the above results, it can be seen that the SRAM energy can significantly dominate the CD-FE logic energy at all values of ξ and v. This behavior validates the focus on optimizing the SRAM energy as described above. For example, at ξ=4× and v=2×, the total SRAM energy is 2.1 µJ and the CD-FE logic energy is 70.8 nJ. The contribution of the energy subcomponents is also apparent in the total CD-FE energy plots shown for the exact and the approximate solutions in FIGS. 37A and 37B, respectively (results are for 18 EEG channels with eight CD-BPFs). These plots show that the CD-FE energy profile is similar to the SRAM energy profile presented above. FIGS. 37A and 37B, respectively, show the total CD-FE energy (logic+SRAM) for (a) the exact solution and (b) the approximate solution. The SRAM energy tends to dominate and thus provides scalability with both ξ and v.

Since $H_i$ are Toeplitz matrices implementing convolution, the filter order determines the number of non-zero coefficients in $H_i$ (see FIG. 23), which in turn determine the feature-extraction energy in the Nyquist domain. However, in the compressed domain, due to the loss of regularity in $\hat{H}_i$, the feature-extraction energy does not depend on the filter order in the same way. Thus, in the compressed domain, the energy can initially increase due to loss of regularity in $\hat{H}_i$, but then can eventually decrease owing to scaling in the size of $\hat{H}_i$ due to both ξ and v. Further, at a given value of ξ and v, the total CD-FE energy can scale by the ratio of the number of non-zero coefficients in $H_i$ to the number in $\hat{H}_i$ to derive an estimate for the Nyquist domain feature-extraction energy. FIG. 37 shows that for the exact solution, at ξ>4×, the total energy of compressed domain processing is less than that projected for Nyquist domain processing (for a 64-order FIR filter).

One downside of directly processing compressively-sensed EEG is that the SVM model for classification can become somewhat more complex at higher values of ξ and v. Intuitively, this happens due to the additional error introduced in the FVs when the compressed-domain equations (Eq. (6)) are solved, which necessitates complex decision boundaries in the classifier. FIGS. 38A, 38B, and 38C show the classifier energy for the approximate solution using three kernels: RBF, $4^{th}$-order polynomial (poly4), and linear, respectively. The SVM classifier energy is measured at the minimum-energy point of 0.48 V for the approximate solution using (a) RBF, (b) poly4, and (c) linear kernel. At a given values of ξ, the classification energy increases with increasing values of v.

FIG. 39 shows the SVM energy for the exact solution using the same three kernels. In each of these cases, the SVM operates at its minimum-energy point of 0.48 V. From FIG. 38, it can be seen that the increase in classifier energy opposes the reduction in CD-FE energy. It can also be seen that the SVM energy increase becomes worse when v is significantly higher than ξ, which reflects the extra error introduced at the algorithmic level due to a degradation in the JL-approximation.

Figure 40:
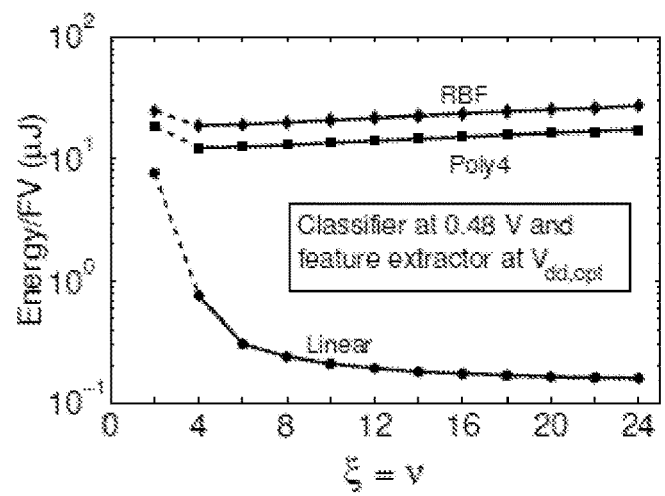
FIG. 40 shows the total processor energy for the exact solution, according to an exemplary embodiment.
Figures 41A, 41B, 41C:
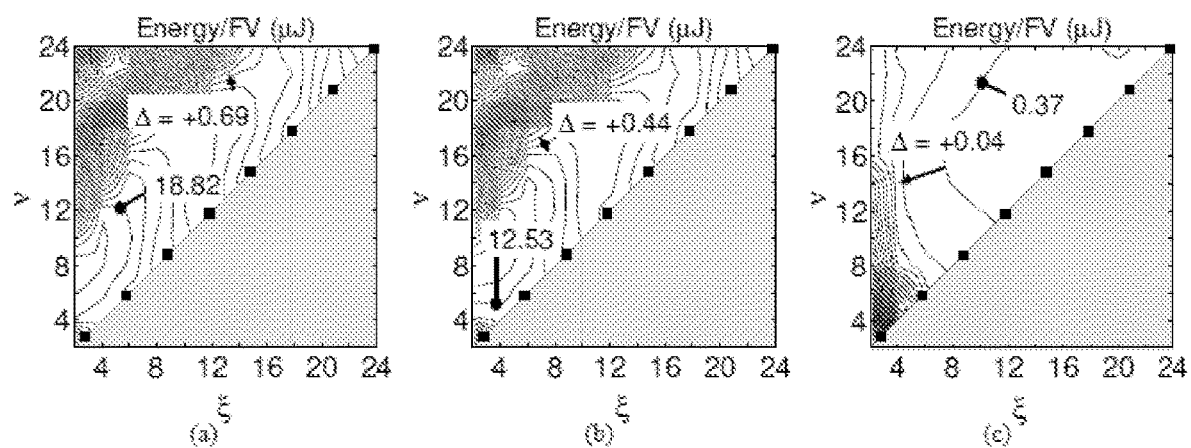
FIG. 41A shows the effect of ξ and v scaling on the total processor energy for the approximate solution using RBF kernel, according to an exemplary embodiment.
FIG. 41B shows the effect of $\xi$ and v scaling on the total processor energy for the approximate solution using poly4 kernel, according to an exemplary embodiment.
FIG. 41C shows the effect of $\xi$ and v scaling on the total processor energy for the approximate solution using the linear classification kernel, according to an exemplary embodiment.

FIG. 40 shows the effect of scaling on the total processor energy for the exact solution. FIGS. 41A, 41B, and 41C show the effect of ξ and v scaling on the total processor energy for the approximate solution using the RBF, poly4, and linear classification kernels, respectively. The SVM operates at 0.48 V, the CD-FE operates at $V_{dd,opt}$ (specified in FIG. 39A), and the SRAMs operate at 0.7/0.42 V during the active/idle modes. The figures show that non-linear SVM kernels (i.e., RBF and poly4) consume significant energy, while SVMs with a linear kernel incur minimal energy, causing the energy scaling characteristics to be dominated by CD-FE at all values of ξ and v. For the non-linear cases, the SVM energy actually leads to optimal ξ and v values. For example, for the exact solution, from FIG. 40, an optimal ξ of approximately 5× minimizes the total processor energy.

Confidentiality of the data generated and/or processed by the system and sensors can be accomplished through strong encryption at the sensor level. For example, AES can be used for encryption. AES is the current symmetric-key cryptography standard and is widely used for providing confidentiality to sensitive information. It employs keys of length 128, 192 or 256 bits to process data blocks of fixed length, such as, for example, 128 bits.

In one embodiment AES-128 (key-size of 128 bits) is used. Initially, a key expansion operation is performed where eleven 128-bit round keys are derived from the cipher key, with the first-round key being equal to the original secret key. Each byte of the 128-bit input is added modulo-2 to each byte of the first-round key, using bitwise XOR, in the AddRoundKey operation. Then, four operations, SubBytes (nonlinear substitution using S-BOX), ShiftRows, MixColumns, and AddRoundKey are repeated for ten transformation rounds (except for the last round that does not include MixColumns) until the input plaintext is converted into the final ciphertext. The decryption algorithm is the inverse of the encryption algorithm.

Different versions of SHA can be used for integrity checking to detect malicious modifications. SHA-2, the currently deployed standard, consists of a set of four hash functions, with 224-, 256-, 384- or 512-bit outputs (called digests). For example, SHA-2 generates a 512-bit output after performing 80 rounds of arithmetic operations, right shifts, and rotations. Another example of a hash function that can be used is Keccak, which was recently selected as the new hash standard, SHA-3. Keccak was reported to have the lowest energy consumption among the five finalist SHA-3 candidates.

It is worth noting that SHA alone cannot guarantee integrity. An imposter may hash and send spurious data if he/she has information about the hash function used. However, the combination of AES and SHA eliminates that possibility, as the attacker cannot generate encrypted data whose plaintext matches the hash digest, without knowing the AES secret key.

Hardware Implementations:

To evaluate the energy consumption of each component in the above embodiment of an encompression architecture, hardware implementations of CS, AES-128, SHA-2, and SHA-3 winner Keccak were developed and synthesized using Synopsys Design Compiler based on the 65-nm TSMC standard cell library. Synopsys Power Compiler was used to estimate the power consumption of these designs, based on gate-level simulation with 10 MHz clock frequency.

TABLE IV

Energy Consumption of CS At 10 MHz

| Input block (B) | Output block (B) | r | Execution time (μs) | Energy (nJ) |
|---|---|---|---|---|
| 48 | 16 | 3 | 39.15 | 0.4108 |
| ... | ... | ... | ... | ... |
| 64 | 16 | 4 | 51.75 | 0.5402 |
| ... | ... | ... | ... | ... |
| 96 | 16 | 6 | 78.15 | 0.8184 |
| ... | ... | ... | ... | ... |
| 128 | 16 | 8 | 103.35 | 1.0805 |
| 256 | 32 | 8 | 410.55 | 3.8891 |
| 384 | 48 | 8 | 925.35 | 8.1601 |
| 512 | 64 | 8 | 1,636.95 | 13.8917 |
| 1,024 | 128 | 8 | 6,537.75 | 67.4299 |
| 2,048 | 256 | 8 | 22,864.95 | 234.8130 |
| 4,096 | 512 | 8 | 104,486.55 | 1085.6475 |
| 8,192 | 1,024 | 8 | 418,329.75 | 4551.8904 |
| 160 | 16 | 10 | 129.27 | 1.3582 |
| ... | ... | ... | ... | ... |
| 192 | 16 | 12 | 154.95 | 1.6296 |
| ... | ... | ... | ... | ... |

TABLE V

Energy Consumption of Encryption and Integrity Checking at 10 MHz

| Algorithm | Block (B) | Input (B) | Output (B) | Energy (pJ) | Error (%) |
|---|---|---|---|---|---|
| AES-128 | 16 | m | m | 23.45 m + 5.95 | 0.25 |
| SHA-2 | 64 | m | 32 | 8.63 m + 5.28 | <0.01 |
| Keccak | 64 | m | 32 | 7.87 m + 26.11 | 2.55 |

Tables IV and V report the energy consumption for each implemented algorithm. In both tables, B refers to bytes.

Table IV is an abbreviated version of a full table that contains 45 entries. It reports the average energy consumption for compressor implementations based on different input and output block sizes (various widths and heights of matrix). The execution time is the time required to process one input block. As expected, the compressor's energy consumption can be seen to be proportional to Φ's size.

For AES and hash functions, the amount of computation is determined by the input size. As a result, the measured energy consumption is linear in input size. Table V reports the energy consumption of AES and hash function implementations as a linear function of input size. These algorithms have fixed block sizes, which are shown in the second column. For each algorithm, the inputs used in the simulation are multiples of the block size. Their range is 16-1024 bytes for AES, 64-1024 bytes for SHA-2, and 128-4096 bytes for Keccak. The root mean square fitting error percentages of the linear models are reported in the last column.

In order to characterize the energy consumption with and without compression, $E_{cs}$ (n, m), $E_{enc}$ (m) and $E_{hash}$ (m) respectively, denote the energy consumption for compressing an n-byte input into m bytes, encrypting m bytes, and hashing m bytes. Let r denote the compression ratio $$\left(\text{i.e., } r = \frac{n}{m}\right).$$

Let $E_0(n)$ be the total energy required to encrypt and hash n bytes without compression, and $E_1(n, r)$ the total energy required to encompress n bytes with compression ratio r. The energy reduction, $\rho(m, r)$, is defined as:

$$\rho(m, r) = 1 - \frac{E_1(mr, r)}{E_0(mr)} \quad (24)$$

$$= 1 - \frac{E_{cs}(mr, m) + E_{enc}(m) + E_{hash}(m)}{E_{enc}(mr) + E_{hash}(mr)}$$

FIGS. 42A and 42B show energy reduction for hardware implementation of encompression. Based on simulation results and Eq. (24), FIG. 42A shows that $\rho(m, r)$ decreases as m increases when r is kept constant, and FIG. 42B shows how $\rho(m, r)$ increases with r when m is kept constant. As FIG. 42A shows, output size m (the height of matrix Φ) has a dramatic impact on $\rho(m, r)$. If m is too large (>65 for r=8 when SHA-2 is used), the additional cost of $E_{cs}$ exceeds the reduction in $E_{enc}$ and $E_{hash}$, and CS does not yield any energy savings. In the following example, m is chosen to be 16 bytes, which is the same as the AES block size. Note that this does not impose any constraint on input data size. If n>16×r, the input data can be partitioned into blocks and processed one block at a time. FIG. 42B shows that when r is within 6-10×, encompression is 55-65% more energy-efficient than encryption and hashing alone.

A software encompression module may be implemented on a commercial sensor node. The energy consumption of an encompressive sensor at the system level may be determined, taking into account all sensor node components, such as the ADC and radio transceiver.

One embodiment of a sensor platform is the eZ430-RF2500. FIG. 43A shows a photograph of an Access Point 5002 and End Device 5004. It is a complete USB-based wireless development platform based on the MSP430 16-bit microcontroller and CC2500 2.4 GHz wireless transceiver. The eZ430 was connected to a PC through its USB interface 5006 as an access point (AP) to receive data from one or more eZ430 devices, configured as end devices (EDs) that sense, encompress, and transmit data to the AP. FIG. 43B shows the experimental setup.

FIG. 43B presents a schematic diagram that shows how the current was measured. By measuring the voltage drop across a 1Ω resistor 5008, the current drawn from the battery 5010 of an ED 5012 was measured and used to compute power consumption. An oscilloscope 5014 was used to visualize the current profile. The battery voltage was 3.226 V. The MP430 clock frequency was 8 MHz and transmission throughput was 250 Kbps.

Figure 44:
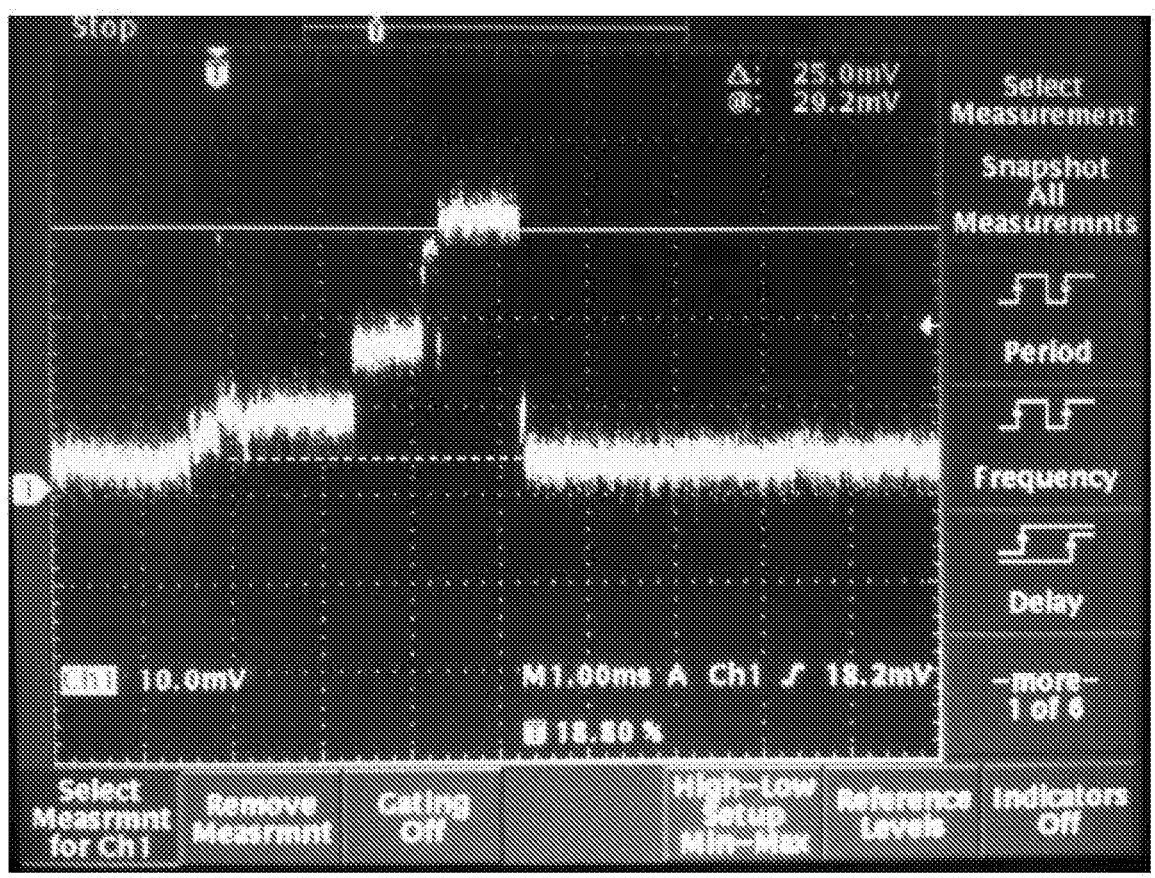
FIG. 44 shows the ED transmission current profile, according to an exemplary embodiment.

An ED's current consumption was measured while it ran a temperature monitoring application. In this application, the ED collects temperature data and sends it to the AP approximately once per second. The oscilloscope shot in FIG. 44 shows the ED current profile for a single measurement and transmission.

The CPU's contributions to power consumption can be evaluated in a straightforward manner, as the events can be traced through an analysis of the application software. The radio events, however, are abstracted from the user by design and often occur by default, executed by hardware, and are invisible to the programmer. Five radio events occur every time the radio is woken up from sleep and performs a successful reception or transmission of information. They are (i) oscillator startup (CC2500 oscillator used to source the chip's system clock), (ii) ripple counter timeout (how many times a ripple counter must time out after a successful oscillator startup routine before signaling the CC2500 chip's ready symbol), (iii) PLL calibration (calibration of the on-chip frequency synthesizer for reception (RX) and transmission (TX)) (demodulation), (iv) RX mode (necessary step before entering TX so that a Clear Channel Assessment can check whether another radio is already transmitting on the channel of interest), and (v) TX mode (data transmission).

After separating the radio and MSP430's current consumption components, each component's current consumption can be calculated based on the measured data and the user manual. Table VI shows the results for the most significant events that contributed to power in both the CPU and radio. Measured data in the middle two columns are italicized to differentiate them from data obtained from the user manual. Note that since only 25 bytes were transmitted in one transmission in this application, the four radio events prior to TX dominate the total current consumption. However, these initialization steps occur only once per transmission, and thus should be considered a constant overhead.

TABLE VI

ED Current Consumption at 8 MHz

|  | Current (mA) | Execution time (s) | Curr. Exec. time (nA · s/B) |
|---|---|---|---|
| Radio event |  |  |  |
| Oscillator startup | 2.7 | 300 | 810.0 |
| Ripple counter timeout | 1.75 | 150 | 262.5 |
| PLL calibration | 8.2 | 809 | 6,633.8 |
| RX mode | 18.8 | 191 | 3,590.8 |
| TX mode | 22.2 | 800 | 17,760.0 |
|  |  | Subtotal | 29,057.1 |
| CPU event |  |  |  |
| MSP430 active | 2.8 | 2,614 | 7,319.2 |
| MSP430 sleep | 1.1 | 66 | 72.6 |
| ADC | 0.85 | 326 | 277.1 |
|  |  | Subtotal | 7,663.8 |
|  |  | Total | 36,720.9 |

TABLE VII

ENCOMPRESSION CURRENT CONSUMPTION AT 8 MHz

| Algorithm | Current (mA) | Execution time per input (microseconds/B) | Curr. Exec. time per input $\frac{nA \cdot s}{B}$ |
|---|---|---|---|
| Compression | 4.55 | 15 | 68.25 |
| XTEA | 4.55 | 112.5 | 511.9 |
| AES-128 | 4.55 | 150 | 682.5 |
| SHA-2 | 4.55 | 72 | 327.6 |
| Keccak | 4.55 | 67 | 304.9 |

CS, AES-128, SHA-2, and SHA-3 winner Keccak were implemented on an eZ430 ED. CS accepts 16×r-byte blocks and outputs 16-byte blocks. Thus, the input size varies for implementations with different compression ratios. Each algorithm was implemented individually because of the sensor node's code size constraint. A lightweight block cipher called XTEA was also implemented, which is a 64-bit cipher suitable for ultra-low power applications. The execution time of each of these software implementations per input byte, and the product of the current drawn and execution time, are shown in Table VII. These results were derived by fitting a linear model to measurements for input sizes of 64, 128, 256, and 512 bytes. The average fitting errors for the five algorithms reported in the table are 1%, 1%, 2%, 2%, and 3%, respectively.

To estimate the energy impact of the software encompressor implemented on a sensor node, an energy model that consists of the following components is assumed. $E_{const}$ represents a constant overhead that accounts for CPU activation, radio initialization, and other factors. $E_{sense}$ denotes the front-end energy consumption for sensing, and $E_{xmit}$ denotes the transmission energy excluding the initialization overhead. $E_{cs}$, $E_{enc}$, and $E_{hash}$ were defined above. All energy components, except $E_{const}$ are functions of the amount of data processed.

Without any security incorporated, the energy consumption for sensing and transmitting n bytes is:

$$E'_0(n) = E_{const} + E_{sense}(n) + E_{xmit}(n) \tag{25}$$

Without CS, to sense, encrypt, and hash n bytes of input, and then transmit n bytes of encrypted message along with k bytes of fixed-length hash value, the energy consumption would be:

$$E_0(n) = E_{const} + E_{sense}(n) + E_{enc}(n) + E_{hash}(n) + E_{xmit}(n+k) \tag{26}$$

With encompression, the n-byte input is encompressed before transmission. Thus, the energy consumption is given by:

$$E_1(n, r) = \tag{27}$$
$$E_{const} + E_{sense}(n) + E_{cs}(n) + E_{enc}\left(\frac{n}{r}\right) + E_{hash}\left(\frac{n}{r}\right) + E_{xmit}\left(\frac{n}{k} + k\right)$$

energy reduction is defined by $$\rho(n, r) = 1 - \frac{E_1(n, r)}{E_o(n)}.$$

In addition, energy bonus is defined as $$p'(n, r) = 1 - \frac{E_1(n, r)}{E_0'(n)}.$$

From the measurements, it was determined that all the energy components could be modeled accurately as linear functions, i.e., $E_{cs}(n)=\alpha n$, $E_{enc}(n)=\beta n$, $E_{hash}(n)=\gamma n$, $E_{sense}(n)=\lambda n$, and $E_{xmit}(n)=\theta n$. Since the compressor has a fixed output size of 16 bytes, $E_{cs}$ here only depends on the input size, which is different from the case considered in Eq. (24). Using Tables VI and VII, and the fact that $V_{cc}=3.226$ V, the constants required in Eqs. (25), (26), and (27) can be determined. Since both SHA-2 and Keccak have 32-byte outputs, k is a constant, i.e., k=32. The rest of the constants are computed to be:

$$E_{const} = 36.48 \mu J, \alpha = 0.220 \frac{\mu J}{B},$$

$\beta$(AES)=2.20 μJ/B, $\beta$(XTEA)=1.65 μJ/B, $\gamma$(SHA-2)=1.06 μJ/B, $\gamma$(Keccak)=0.98 μJ/B, $\lambda$=0.29 μJ/B, and $\theta$=0.71 μJ/B. $E_{const}$ is derived by adding up the CPU and radio start-up overheads. $\lambda$ is obtained from the user manual. Other constants are translated directly from Tables VI and VII.

Figure 45A:
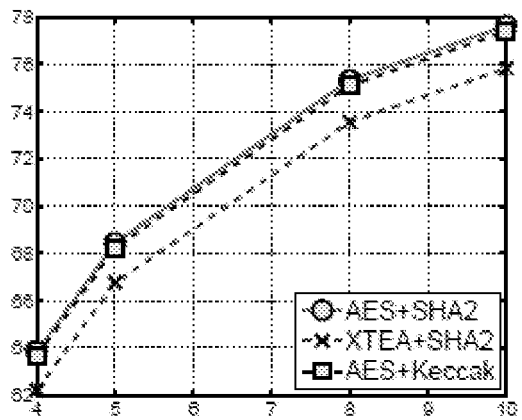
FIGS. 45A-45B show an energy reduction p for encompression for different combinations of cryptographic algorithms, according to an exemplary embodiment.
Figure 45B:
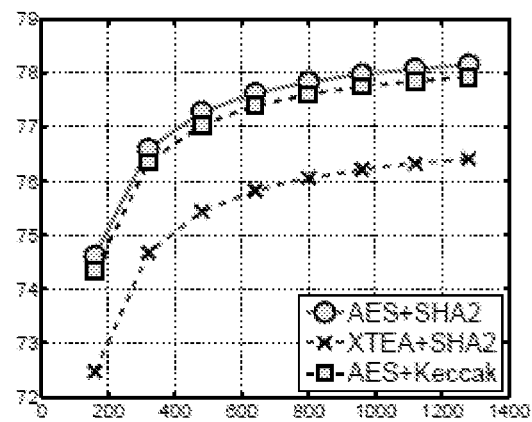
Figure 46A:
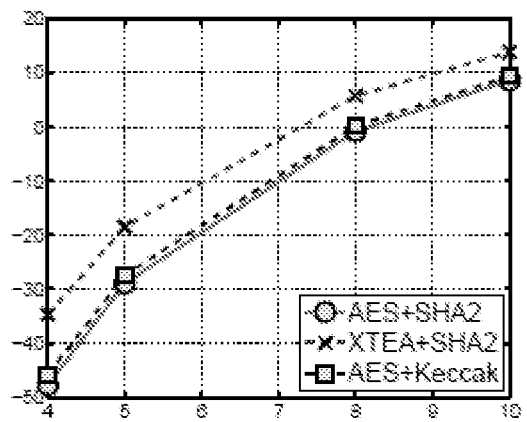
FIGS. 46A-46B show an energy bonus p' for encompression for different combinations of cryptographic algorithms, according to an exemplary embodiment.
Figure 46B:
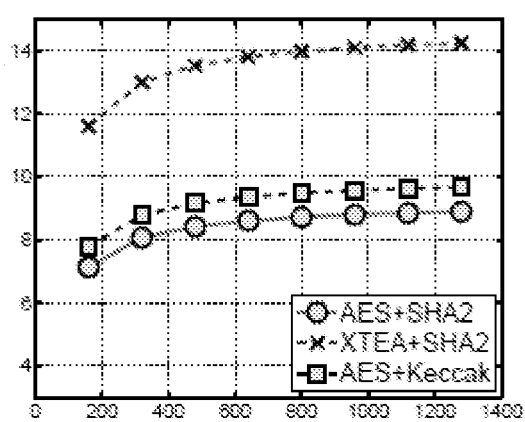

FIGS. 45 and 46, respectively, show energy reduction ρ and energy bonus ρ' for different combinations of cryptographic algorithms. In FIGS. 45A and 46A, the compression ratio r varies and the input size per transmission n is kept constant, whereas in FIGS. 45B and 46B, it is the other way around. As shown in FIGS. 45A and 46A, both ρ and ρ' increase with r, because when data are compressed more, less data have to be encrypted, hashed, and transmitted. From FIGS. 45A and 45B, the AES+SHA-2 configuration can be seen to yield the highest energy reduction. This is because AES and SHA-2 are more energy-consuming than XTEA and Keccak, respectively.

As shown in FIGS. 45B and 46B, ρ and ρ' increase as the data size per transmission increases. In the beginning, when the constant overhead $E_{const}$ weighs heavily on total energy consumption, ρ and ρ' increase fast. They soon saturate, as the marginal effect of adding more data into every transmission decreases. Note that ρ' is not always positive. For input size n=640, ρ' is positive when r>8. With r=10, ρ' can be over 14% when n=1280 for the XTEA+SHA-2 configuration.

Figure 47A:
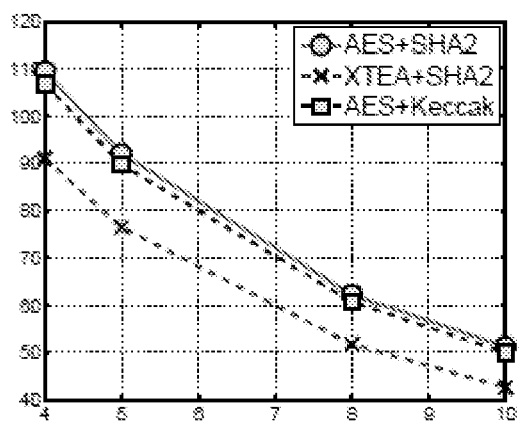
FIGS. 47A-47B show energy overhead of encompression versus compressive sensing without cryptography, according to an exemplary embodiment.
Figure 47B:
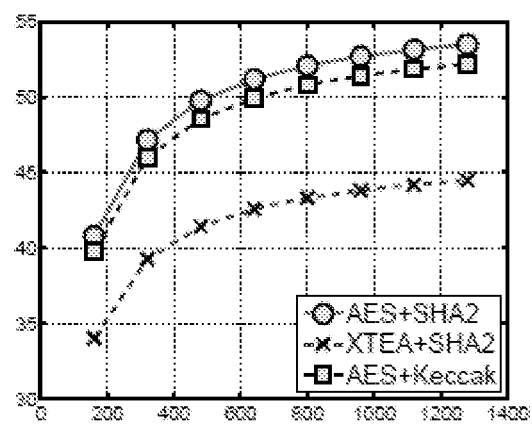

Note that CS can be utilized to reduce energy consumption, even if no cryptography is used. Compared to such a case, it is natural to expect the addition of encryption and hashing to add energy overheads. FIG. 47 quantifies these overheads. FIG. 47A shows that the overheads decrease with higher compression ratios, since less data needs to be encrypted/hashed, and the constant component of energy ($E_{const}$) accounts for larger fractions of total energy consumption. With increasing data size, in FIG. 47B, the reverse effect can be seen, due to the diminishing impact of $E_{const}$. For a compression ratio of 10, the overhead of cryptography is 35-53%. Although this is still significant, it should be interpreted in light of the fact that the baseline has already been drastically reduced due to CS.

Overall, these results demonstrate the benefits of encompression in enabling secure, yet energy-efficient, communication in sensor networks.

As can be seen by the analysis of the energy consumption of each sensor component described above, the linear energy model shows that by increasing the compression ratio and data size per transmission, energy reduction of up to 78% can be achieved. In some cases, the total energy consumption with encompression can be even smaller than the original system that does not include security. With a compression ratio of 10, an energy bonus of above 14% can be achieved if input size is greater than 1280 bytes. Further benefits can be achieved by adding machine learning to the system to provide on-node analysis.

Due to the challenges associated with signal reconstruction, compressive sensing has previously been used primarily in applications where the sensor nodes acquire and relay data to a remote base station for analysis. The present system provides on-node analysis in addition to encompression and encryption. Random projections, which are used in compressive sensing, preserve inner products of signals, which are at the core of several machine-learning algorithms. An important aspect of exploiting inference frameworks for signal analysis, however, is to develop an ability to process signals before classification in order to create data representations based on critical signal features. One embodiment of the present disclosure provides a new auxiliary matrix in the regularized equations to achieve an exact solution for any linear signal-processing function in the compressed domain. This approach retains performance up to much higher values of ξ than were previously possible. An embodiment of a new auxiliary matrix also introduces previously unexplored knobs, which are under the control of a designer, to significantly reduce computational energy based on the accuracy needs of the system. This approach is referred to herein as compressed analysis (CA), wherein the end-to-end embedded signals are representations based on compressive sensing.

Figure 48:
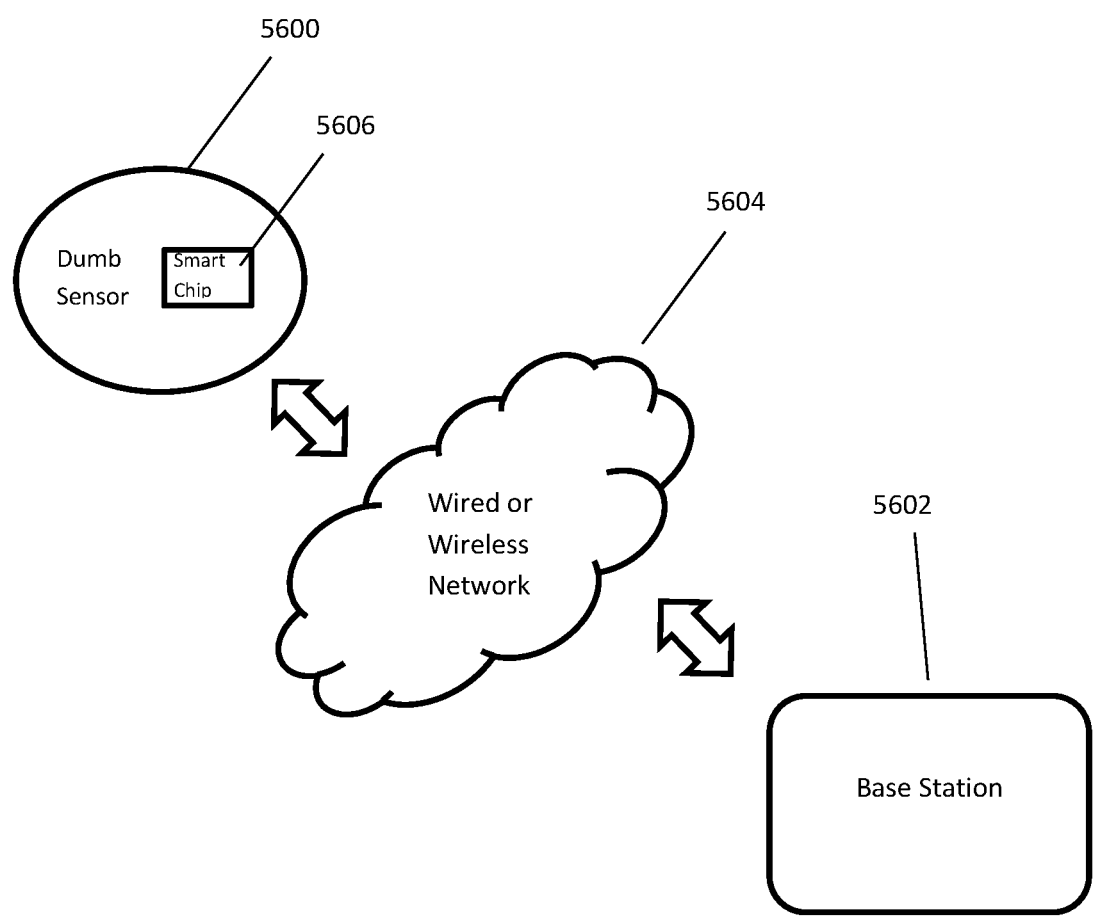
FIG. 48 shows a sensor having an add-on chip to provide additional functionality and energy savings according to an exemplary embodiment.

The embodiments described above may be implemented as full sensors or they can be incorporated as an add on component, such as, for example, a chip, integrated circuit, or field programmable gate array, to existing sensors to make them more energy-efficient and allow them to become smart sensors. As shown in FIG. 48, sensor 5600 is currently deployed as a dumb sensor as it merely detects certain signals from the environment that are converted to a temperature measurement and the data regarding temperature measurement is transmitted to a base station 5602 over a wired or wireless network 5604. Chip 5606 is a smart sensor according to an embodiment of the present disclosure, which includes the ability to analyze the rate at which the temperature rises or falls. Chip 5606 also includes compressive sensing, feature extraction, classification, encompression, and machine learning, such as, for example, inference. The chip 5606 is retrofit onto sensor 5600 to provide these additional capabilities to the sensor 5600. When combined together with chip 5606, the sensor 5600 includes smart capabilities that allow the sensor 5600 to analyze data and transmit the analyzed data to another location, such as, for example, the base station 5602, where it can be further utilized. The combined sensor 5600 also includes energy savings capabilities and can continue to operate for a similar period of time as the sensor 5600 would have operated absent the combination with chip 5606.

Figure 49:
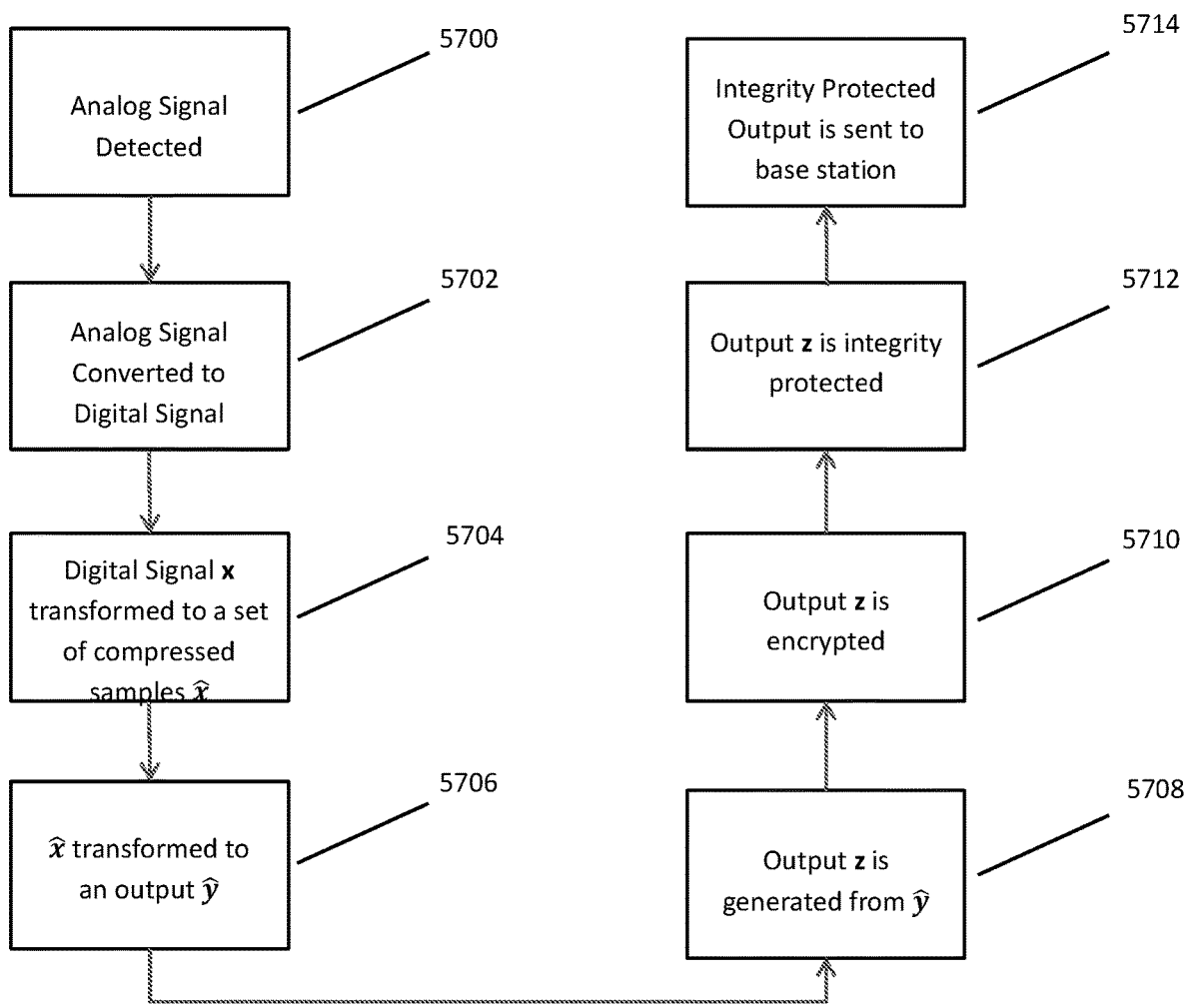
FIG. 49 shows a process according to an embodiment of the present disclosure.

As shown in FIG. 49, the sensor 5600 when used in conjunction with chip 5606 operates similar to the sensor described above in connection with FIG. 2. In step S700 a stimulus or signal is received or detected by the sensor 5600 and is routed to an analog-to-digital converter within the sensor. In step S702, the sensor 5600, via the analog-todigital converter, converts the analog signal to a digital N-sample signal x. In step S704, digital N-sample signal x is routed to a CS component or element, where the digital N-sample signal x is transformed to a set of M (O{C log(N/C)}<M<<N) compressed samples (denoted by x̂). In alternative embodiments, some other compression component or element may be used. The CS component or element may be implemented in hardware, in software or as a combination of hardware and software. The CS component or element is described in greater detail above. Upon completion of the CS, in step S706, an output x̂ is directed to an inference component or element, where the inference component or element generates an output ŷ from input x̂, where ŷ represents a compressed-domain feature vector. This may be accomplished by transforming data into the Euclidean space, for example, by employing a feature extraction component or element which performs one or more signal-processing functions. As part of the inference component or element, a linear or nonlinear classification component or element may be used to perform inference over the data. In step S708, the classification component or element generates an output z, where z is a filtered signal of N samples. Each of the inference component or element, the feature extraction component or element and/or the linear or nonlinear classification component or element, may be implemented in hardware, in software or as a combination of hardware and software. For example, a support vector machine may be used for the classification component or element. In step S710, the output z is routed to the encryption component or element, where it is encrypted. Before the output of the encryption component or element is sent to the base station, in step S712, the output z is integrity-protected at the hashing component or element, for example, using a cryptographic hash algorithm. Each of the encryption component or element and the hashing component or element may be implemented in hardware, in software or as a combination of hardware and software. After the output z is integrity-protected, in step S714, the integrity protected output may be sent to a base station or another sensor, or used for some other purpose.

The invention claimed is:

1. A detector, comprising:
   a data compressor, wherein the data compressor implements an algorithm for converting a set of data into a compressed set of data;
   a machine learning module coupled to the data compressor, wherein the machine learning module transforms the compressed set of data into a vector and filters the vector;
   a data encryptor coupled to the machine learning module, wherein the data encryptor encrypts the filtered vector;
   an integrity protection module coupled to the machine learning module, wherein the integrity protection module protects integrity of the filtered vector, where the integrity protection module is used in parallel with the data encryptor; and
   a transmitter configured to transmit the encrypted filtered vector to a remote location.

2. The detector of claim 1, wherein the data compressor implements compressive sensing.

3. The detector of claim 1, wherein the machine learning module comprises an inference module.

4. The detector of claim 1, wherein the data encryptor encrypts the filtered vector using encompression.

5. The detector of claim 1, further comprising an analog-to-digital converter coupled to the data compressor.

6. The detector of claim 1, wherein the machine learning module comprises a feature extractor and a classifier.

7. The detector of claim 6, wherein the classifier is linear.

8. The detector of claim 6, wherein the classifier is non-linear.

9. The detector of claim 6, wherein the classifier comprises a neural network.

10. The detector of claim 6, wherein the classifier is a support vector machine.

11. The detector of claim 1, wherein the integrity protection module comprises a hashing module.

12. The detector of claim 11, wherein the hashing module comprises at least one of SHA-2, SHA-3, and SHA-4.

13. The detector of claim 11, wherein the hashing module comprises a cryptographic hashing module.

14. A method for processing detected signals at a detector using one or more processors, the method comprising:
   converting a set of data into a compressed set of data using a data compressor controlled via the processors;
   transforming the compressed set of data into a vector and filtering the vector using a machine learning module controlled via the processors;
   encrypting the filtered vector using an encryptor controlled via the processors; and
   protecting integrity of the filtered vector using an integrity protection module controlled via the processors, where protecting integrity of the filtered vector is performed in parallel with encrypting the filtered vector.

15. The method of claim 14, wherein the set of data is converted into a compressed set of data using compressive sensing.

16. The method of claim 14, wherein the machine learning module comprises an inference module.

17. The detector of claim 14, wherein the encrypting of the filtered vector is accomplished using encompression.

18. The method of claim 14, further comprising converting a set of analog data into the set of data using an analog-to-digital converter.

19. The method of claim 14, wherein the transforming of the compressed set of data into a vector is accomplished using a feature extractor, and filtering the vector is accomplished using a classifier.

20. The method of claim 19, wherein the classifier is linear.

21. The method of claim 19, wherein the classifier is non-linear.

22. The method of claim 19, wherein the classifier comprises a neural network.

23. The method of claim 19, wherein the classifier comprises a support vector machine.

24. The method of claim 14, wherein the integrity is protection module comprises a hashing module.

25. The method of claim 24, wherein the hashing module comprises a cryptographic hashing module.

26. A device, comprising:
   a data compressor, wherein the data compressor converts a set of data into a compressed set of data;
   a machine learning module coupled to the data compressor, wherein the machine learning module transforms the compressed set of data into a vector and filters the vector;
   a data encryptor coupled to the machine learning module, wherein the data encryptor encrypts the filtered vector;
   an integrity protection module coupled to the machine learning module, wherein the integrity protection module protects integrity of the filtered vector, where the integrity protection module is used in parallel with the data encryptor; and a transmitter configured to transmit the encrypted filtered vector to a remote location.

* * * * *

UNITED STATES PATENT AND TRADEMARK OFFICE
CERTIFICATE OF CORRECTION

| | |
|---|---|
| PATENT NO. | : 11,783,060 B2 |
| APPLICATION NO. | : 16/479714 |
| DATED | : October 10, 2023 |
| INVENTOR(S) | : Niraj K. Jha |

It is certified that error appears in the above-identified patent and that said Letters Patent is hereby corrected as shown below:

In the Claims

Column 42, Line 51, delete the word "is".

Signed and Sealed this
Fourteenth Day of November, 2023

Katherine Kelly Vidal
*Director of the United States Patent and Trademark Office*